(12) United States Patent
Vantalon et al.

(10) Patent No.: US 8,474,054 B2
(45) Date of Patent: Jun. 25, 2013

(54) SYSTEMS AND METHODS FOR CONDITIONAL ACCESS AND DIGITAL RIGHTS MANAGEMENT

(75) Inventors: Luc Vantalon, Los Altos, CA (US); Paolo Siccardo, Los Altos, CA (US)

(73) Assignee: Digital Keystone, Inc., Mountain View, CA (US)

( * ) Notice: Subject to any disclaimer, the term of this patent is extended or adjusted under 35 U.S.C. 154(b) by 937 days.

(21) Appl. No.: 11/823,194

(22) Filed: Jun. 26, 2007

(65) Prior Publication Data

US 2009/0007240 A1     Jan. 1, 2009

(51) Int. Cl.
    *H04N 7/16*     (2011.01)
(52) U.S. Cl.
    USPC .......................................................... 726/27
(58) Field of Classification Search
    USPC .......................................................... 726/27
    See application file for complete search history.

(56) References Cited

U.S. PATENT DOCUMENTS

| | | | |
|---|---|---|---|
| 6,810,389 | B1 | 10/2004 | Meyer |
| 8,037,541 | B2 | 10/2011 | Montague et al. |
| 2002/0013772 | A1* | 1/2002 | Peinado ........................ 705/51 |
| 2004/0039916 | A1* | 2/2004 | Aldis et al. ................... 713/177 |
| 2004/0243821 | A1* | 12/2004 | Kim et al. ..................... 713/200 |
| 2006/0123246 | A1 | 6/2006 | Vantalon et al. |
| 2006/0212405 | A1 | 9/2006 | Gordon et al. |
| 2007/0100764 | A1 | 5/2007 | Kim |
| 2007/0294170 | A1 | 12/2007 | Vantalon et al. |

FOREIGN PATENT DOCUMENTS

| | | |
|---|---|---|
| EP | 1 316 900 A2 | 6/2003 |
| EP | 1 564 622 A2 | 8/2005 |
| WO | WO 2005/066874 A2 | 7/2005 |
| WO | WO 2006/054988 A2 | 5/2006 |

OTHER PUBLICATIONS

PCT International Search Report and Written Opinion for PCT International Appln No. PCT/US2008/064590, mailed on Nov. 12, 2008 (12 pages).

Van Moffaert, A. et al. "Digital Rights Management", Alcatel Telecommunications Review, Apr. 1, 2003 Alcatel, Paris Cedex, FR.

* cited by examiner

*Primary Examiner* — Cordelia Zecher
(74) *Attorney, Agent, or Firm* — Blakely, Sokoloff, Taylor & Zafman LLP

(57) ABSTRACT

Conditional access (CA) and digital rights management (DRM) in digital media delivery, processing, and storage systems. Methods and apparatuses are provided for managing digital rights under the protection of multiple CA and/or DRM systems. Some embodiments provide secure and robust methods for bridging multiple DRM systems in the digital media content distribution and playback systems. The present invention simplifies content repurposing, after it has been bridged to a secondary DRM system, but still under the control of the original DRM system.

75 Claims, 26 Drawing Sheets

SYSTEMS AND METHODS FOR CONDITIONAL ACCESS AND DIGITAL RIGHTS MANAGEMENT

BACKGROUND OF THE INVENTION

1. Field of the Invention

The present invention generally relates to digital media delivery and management systems. More particularly, the present invention pertains to systems for digital rights management.

2. Description of the Related Art

Digital media usually refers to some form of electronic media that can be manipulated by digital processing systems in one way or another. Unlike analog media, digital media is typically transmitted, stored, and/or processed in digital forms, e.g., in binary formats.

Use of digital media has been gaining popularity over the last few decades partly due to their technical advantages over the analog counterpart, such as robustness over noise, and partly due to the wide availability of various digital information processing systems such as personal computers and CD or DVD players. Digital media are generally easier to process and/or manage and they are often considered to have higher perceptual qualities. Digital broadcasting has also been gradually gaining momentum in the cable and satellite television or radio industries. Moreover, terrestrial digital television (DTV) broadcasting has been tentatively scheduled to supersede analog television by early 2009 in the United States.

The better processing capability of digital media is, however, also one of the downsides of using digital media. For example, digital media, or more precisely digital data associated with digital media, can be reproduced indefinitely without any loss of quality, often with no or very little cost. Furthermore, it can be easily altered or modified or copied in part or in whole without any accountability. This has been a hindrance to wide-scale adoption of digital media in many potential application areas. This is especially true for copyrighted media, or media that otherwise need to be protected for transmission, access, or reproduction. In many cases, the user needs special rights or permissions in order to be able to perform certain tasks or operations associated with a digital media. This is often referred as digital rights. The term digital rights sometimes refers to legal rights associated with the digital media. It sometimes refers to technical rights or capabilities, and it may not necessarily coincide with the rights' holder's legal rights.

A digital rights management (DRM) system manages digital rights and also rights of other types of media. Many digital media publishers and vendors use DRM systems to protect copyrighted or otherwise access-controlled materials. Typical DRM systems use various technical measures to identify, describe, analyze, valuate, trade, monitor, and track digital rights. For example, DRM systems often use copy protection measures to control and/or restrict the use and access of digital media content. In the commercial context, DRM provides a method to control any duplication and dissemination of digital media so that appropriate fees can be collected, for example, for each copy or for each performance of the media content.

A typical DRM system uses encryption and decryption software for this purpose along with other software or hardware based security measures. For example, HD DVD and Blue-ray movies are encrypted, or scrambled, using Advanced Access Content System (AACS). The data on the medium is encrypted, in addition to being compressed or encoded in MPEG-4 format, and it may only be decrypted and viewed using one or more valid decryption keys. In a typical DRM scheme, a DRM server wraps the digital content through encryption according to applicable policies.

Once the digital media is delivered, a DRM client unwraps the content and makes it accessible to the user in accordance with his or her rights. DRM clients may include desktop PCs, handhold devices, set-top boxes, mobile phones and other portable devices as well as other dedicated digital media players (e.g., for music, movies, etc.) and television and radio sets. The digital rights are typically distributed to clients separately from the wrapped media content. They can be distributed at the time of the content distribution, or they can be dynamically accessed later when needed, for example, at the time of storage or playback.

In the cable industry, and in other related industries such as satellite broadcasting, media is protected by conditional access (CA) systems. CA refers to a technique for limiting the access of protected content to authorized users. In a typical CA system such as those used in the cable television industry, the scrambled media content is delivered along with a decryption key called a control word (CW). The control word is embedded in an encrypted message called ECM (entitlement control message), which can be decrypted using another key called a service key (SK). The service key is delivered to the user in a different message called EMM (entitlement management message), and it may be decrypted using a user-specific decryption key, or user key (UK), which is typically associated with a client device, either at hardware or firmware level, such as a "smartcard". The lifetime of each key varies depending on the purpose, and it varies from application to application. Typically, the lifetime of CW is much shorter (on the order of 0.1 second for live video stream) than that of SK, which is, for example, on the order of a month or so for a subscription channel in the cable television. SK and CW can also be associated with a particular media, for example, a movie title for pay-per-view. The UK is usually permanent, but can be replaced by providing a new smartcard to the user. Typical CA systems also have the ability to "revoke" UKs from unauthorized devices. It should be noted that a CW is not generally user specific. Using the (subscriber-specific) SK, the system can securely broadcast other common information, such as the CWs or the media content, to subscribers simultaneously without having to broadcast a different program for each of the subscribers.

The digital media content (e.g., video and audio signals) of one program, typically in the MPEG-2 or MPEG-4 format in the case of cable television, is sometimes multiplexed together with those of other programs for transmission so that multiple programs appear to be transmitted simultaneously. A CA system scrambles the digital form of programs and transmits the entitlement control messages and the entitlement management messages with the digital form of programs for broadcast either within the multiplex (e.g., for satellite) or through an out-of-band channel (e.g., for cable).

Content encryption is typically done using symmetric key cryptography, while key encryption is typically done using public key/private key cryptography. In symmetric key cryptography, the same or essentially equivalent keys are used to both encrypt and decrypt the data. In the asymmetric or public key cryptography, different but related keys are used to encrypt and decrypt the data. Public keys may be derived from the corresponding private keys in certain cryptographic schemes, but not vice versa. In general, encryption/decryption schemes based on symmetric key cryptography are less expensive than those using asymmetric key cryptography in terms of computational requirements.

Typically, a client device such as a set-top box (STB) at the receiving end descrambles the data stream and decodes the MPEG-2 data for viewing. A tuner portion of the STB receives the incoming signal, demodulates it and reconstitutes the transport stream, which contains multiple packets of information. The set-top box can de-multiplex the entitlement management messages and entitlement control messages and the media content. The data (e.g., service key and control word) contained in the entitlement management message and entitlement control message are used to descramble the encrypted programming content. The set-top box then decodes the MPEG data and renders the content for viewing.

FIG. 1 illustrates an overall "architecture" of an exemplary DRM/CA system in a block diagram form. The figure shows a virtual zone or realm, all again within the same security system, associated with a digital management system or a conditional access server 101. DRM systems may have their own servers. Or, alternatively, certain related CA servers may be used for various DRM purposes such as authenticating clients. DRM systems may also manage the digital rights associated with digital media through other methods. An example of this DRM system is an on-line movie distributor system. In this example, the DRM server 101 typically resides across a network 102 such as cable network, satellite network, wireless phone network, or the Internet, from a DRM client device 103. When a digital media is delivered to the client 103, either from the DRM server 101 or from other digital media services, the client first needs to get proper permission or entitlement before it can play or display the delivered content. The CA server 101 typically resides across a network 102, such as cable network, satellite network, wireless phone network, or the Internet, from a client device 103, which can be a CA Client or a Set-top Box. When a digital media is delivered to the client 103, either from the DRM/CA server 101 or from other digital media services, the client first needs to get proper permission or entitlement before it can play or display the delivered content. The permission is often delivered as ECMs (e.g., in cable television transmission) as stated earlier. In typical real-time digital media delivery systems such as cable television, the required ECMs are simultaneously delivered along with the digital media content. In the example shown in FIG. 1, the DRM/CA server 101 is responsible for various DRM/CA-related tasks and it provides necessary support to the authenticated client 103 for accessing digital media content which the client is entitled to. The client can play the media on a display 105 in real time and/or store it for later viewing. The figure shows a storage unit 104 within the DRM realm associated with the client. It may be a part of the client device 103 in some cases. The digital media is typically stored in the storage unit in an encrypted/scrambled form, or in an otherwise protected form. In this example, the DRM system is responsible for protecting the stored digital media. In order for a client device such as a media player to have access to the content of the stored media, it needs to have proper permission, which is provided by the DRM/CA system in case the client is legitimately entitled to certain operations on the digital media.

FIG. 2 illustrates various message or data types used in certain implementations of conditional access (CA) schemes. In particular, the figure shows an entitlement management message (EMM) 134, an entitlement control message (ECM) 140, and a scrambled content 146, along with various encryption/decryption keys, which are typically used in CA systems in the cable television industry. A client device (not shown in the figure) typically contains a security device 130 associated with a CA server (not shown), and the security device has a unique user key (UK) 132 to represent a subscriber. The security device 130 may be a smartcard. The user key 132 can be used to decrypt the entitlement management message (EMM) 134, which has the encrypted service key (SK) 138. The client, or the security device 130, performs the EMM decryption 136 using the user key 132 to recover the service key 138. The entitlement control message (ECM) 140, on the other hand, contains an encrypted control word (CW) 144. In typical operations, the client, or the embedded security device 130, further performs the ECM decryption 142 using the service key 138 to recover the control word 144. The scrambled content 146, that is, the digital media content encrypted with CW 144, can then be descrambled using the control word to generate the clear content 150. Typically, the CA server provides the control word to an authorized client to descramble the content, at 148. The descrambled, or clear, digital media content 150 can be either played on the client device or re-encrypted for further processing or for (temporary or permanent) storage. In many cases, however, the scrambled content 146 can be recorded, sometimes along with the ECM 140, for later use and it is protected by a copy protection (CP) system, a DRM system, or a different CA system. The DRM system manages the rights according to the information in the EMMs and/or ECMs.

It should be noted that encryption and decryption keys are symbolically represented by locks and keys, respectively, in FIG. 2 and in other drawings throughout this disclosure. Even though these two different symbols are used for consistency whenever possible, it should be understood that, in symmetric key cryptography, the same or essentially equivalent keys are used for both encryption and decryption operations whereas, in public key cryptography, encryption keys (i.e., locks) and decryption keys (i.e., keys) are different and, in particular, it may not be computationally feasible to derive decryption keys from the corresponding encryption keys. As noted earlier, in digital media delivery and management, content scrambling (e.g., encryption of digital media content) is typically done using (generally computationally cheaper) symmetric key cryptography, while key encryption (e.g., encryption of service keys) is typically done using (generally easier to exchange) public key cryptography.

Although FIG. 2 shows a particular encryption/decryption arrangement of a CA system, it is understood that different arrangements can be used as well. In general, the entitlement management messages are unicast to individual devices to individually authorize entitlement and the entitlement control messages are typically broadcast to all devices to globally provide the information to retrieve the content key for descrambling the broadcast stream. A service key represents the entitlement recovered from the entitlement management message and a control word represents the key recovered from the entitlement control message for descrambling the media content. The descrambler of a digital television system uses standard algorithms, e.g., Common Scrambling for Digital Video Broadcasting (DVB-CSA) and Digital Encryption Standard (DES) for Advanced Television Systems Committee (ATSC) standard (conditional access system for terrestrial broadcast). The descrambler (e.g., 148 in FIG. 2) can be conveniently placed on any of the various components (e.g., a bridge, a renderer, or a storage system) in a client device.

With respect to FIGS. 3A and 3B, exemplary scenarios are illustrated in which digital media content is delivered and protected by a CA server and/or a DRM system. In FIG. 3A, an access control device 172, which is typically a part of a client device (not shown in the figure), has a user key 174 to decrypt the entitlement management message 176, which contains an encrypted service key (SK), which in turn is used to decrypt the entitlement control message 178. ECM 178 contains the encrypted control word (CW). The scrambled content 180, which is encrypted by the control word, is then decrypted by the client device. The access control unit 172, or any component associated with the client device, with the appropriate rights descrambles the protected content 182 using the control word 184 and provides the content 186 to the user. The content can either be re-scrambled and stored in a storage device for later viewing or it can be provided for real time use. The client device may directly record the original CA protected content (e.g., as illustrated in FIG. 3A), or record the content with substitutive CA/DRM protection (e.g., encrypting with replacement entitlement control messages, or rescrambling using different control words, etc.).

In the scenario shown in FIG. 3B, the recovered control word 210 is protected by a DRM system (symbolically represented by a cryptographic key 208 in the figure). In this example, only a certain CA/DRM client, e.g., an access control device 202 with a user key 204, which has appropriate rights (e.g., having access to the decryption key 208) can descramble the DRM protected CW 206 to get the CW 210. Then the decrypted control word 210 is used to descramble the delivered or stored media content 212 to obtain clear the content 214.

In typical conditional access of a primary security system (e.g., digital TV or satellite TV), the control word, which is a global key, needs to change frequently (e.g., once every 0.1 second) to avoid key-sharing attack. However, to locally protect the recorded and stored content with a DRM system, a control word that is unique to the access control device does not need to change as frequently. For example, an entire recorded movie may be rescrambled using only one control word. It should be noted that different CA systems and DRM systems may have entirely different implementations of EMMs and ECMs but have similar or same descramblers for content protection (e.g., according to the ATSC Standard).

Multiple digital rights management systems can be used for protection of digital media, e.g., at the same time or alternately depending on the contexts. For example, the digital media owners such as movie studios and media delivery services such as cable companies might utilize different and separate DRM systems for the same digital media, or for different parts of the same media. Similarly, the same cable television company (e.g. Comcast Corp. of Philadelphia, Pa.) may use different CA systems for different contexts or for different domains. Digital rights management can also be implemented in a hierarchical fashion or in multiple domains. This is illustrated in FIG. 4A where different DRM (254, 258, 260) or CA (262) systems can also be involved for protection of digital media at different stages of their delivery, processing, playing, and storage processes. For example, FIG. 4A shows an exemplary context where multiple CA and/or DRM systems are employed during delivery of digital media. The media is delivered from a CA server 262 to a client (e.g., a storage unit 278 in the figure), and it is initially protected by the same CA server in this example. The broken-line box 252 represents this "virtual domain" or zone in which the CA server 262 is responsible for enforcing proper access rules regarding the digital media. The figure shows three more virtual DRM domains, 254, 258, and 260, each of which is under the protection of a DRM system (not explicitly shown in the figure). When the digital media is passed from one DRM system to another DRM system, the media content (and its associated keys) may be descrambled/decrypted using the keys from one DRM system and rescrambled/encrypted using the keys from the next DRM system. In the example illustrated in FIG. 4A, the media under the protection of CA server 262 is descrambled, 264, and scrambled again, 266, in the DRM system 254. The media is then passed to the next DRM system 258, through descrambling 268 by DRM system 254 and scrambling 272 by DRM system 258, and again to the next DRM system 260, through descrambling 274 by DRM system 258 and scrambling 276 by DRM system 278. In this example, the scrambled digital media content is stored, 278, e.g., in a client device, and the last DRM system 260 is responsible for protecting the stored digital media. The DRM systems closer to the source of the digital media are typically more "global" than the ones closer to the sink or the client. In other words, the DRM system 258 of the figure, for example, is more "local" than the DRM system 254. Generally, there is a one-to-many relationship between a global or upstream DRM system and a local or downstream DRM system. It should be noted that, in this particular example, whenever the digital media passes the DRM system boundaries, the media is exposed in clear forms, with the control passed completely from the previous DRM to the next DRM. For example, at a point labeled 270 in FIG. 4A, the media (and/or any associated security keys) has been descrambled by DRM system 254, thus DRM system 254 loses control over the media content. The media is then scrambled by the next DRM system 258, thus comes under control of this DRM system 258. This can be a potentially vulnerable point in a business model involving multiple DRM systems such as the one shown in the figure where the original owner of the media passes the media control completely to other DRM systems.

This vulnerability can be protected by various bridge protection schemes, where an exemplary is schematically illustrated in FIG. 4B, where two different DRM domains 232, and 234 are shown. In the figure the media is shown in different stages of protection (Encryption A, Encryption B and Encryption C) and the decryption and re-encryption processes are not shown. In this particular example, in the first stage (Encryption A) the digital media delivered from across the network 236 may first be protected by the DRM system 232. In the second stage (Encryption B) the digital media may be protected by both DRM systems 232 and 234. In the third stage (Encryption C) the digital media may be protected only by the second DRM system 234. For example, the first DRM system 232 may be managed by a cable company and the second DRM system 234 may be managed by a movie studio. In order for a user to play the delivered content, he or she may need to get proper access permission from either system, or from both systems, depending on the implementation. In general, there may be multiple content distributors, multiple content owners, and/or multiple content players of the same digital media, each of which may have its own DRM or CA system.

Some DRM systems can store content that are still protected by the operator CA system. In this mode, ready access to CA servers may be required to access protected digital media. For example, when the digital media is stored in a user's device, in order to play the stored media the user may need to obtain an access grant from the corresponding CA server, e.g., as a form of an ECM. The associated ECM, or a CW contained in the ECM, may also be downloaded at the time when the media content is delivered.

In some cases, a CA server may provide entitlement valid only at playback time. For example, the system can allow the user to record (scrambled) programs that the user is not entitled to use at the time of recording. After the user obtains the required rights (e.g., through purchase of pay-per-view service, or by upgrading a subscription package, etc.), the user can then play back the recorded information at later convenient time. As stated earlier, the descrambled content and/or decrypted keys may be rescrambled/encrypted using a different scheme, such as the one based on a DRM system, before it is stored in a storage device.

Further information about bridge protection system can be found in U.S. patent application Ser. No. 11/446,427, filed on Jun. 2, 2006 which application is incorporated herein by reference. The bridge protection schemes create certain problems for the end clients of the DRM system on how the inner DRM system will deal with the original DRM protection after the bridging has occurred. For example, a CA media under the CA rules may be stored in a client of a DRM system. The client normally has a subscription agreement with the DRM system, but typically does not deal directly with CA system, and therefore would have difficulty in changing the CA rules under the DRM system. For example, the content protected by the CA system may be restricted by the CA system's access rules so that it can be played for a limited period of time (e.g. only for one week) or may be played back only once or twice. The user may be forced, in this case to "upgrade" the service from the CA system to obtain greater access rights, but the user's (e.g. client) system is a DRM system which may not have all the necessary keys, etc. to obtain the upgrade.

SUMMARY OF THE DESCRIPTION

The present invention pertains, in general, to methods and apparatuses for conditional access (CA) and digital rights management (DRM) in digital media delivery and management systems. According to an embodiment, systems and methods for conditional access and copy protection in multiple DRM and/or CA domains are provided. According to another embodiment, methods and apparatuses are provided for managing multiple DRM domains in the presence of one or more CA servers. Some embodiments provide methods and apparatuses for bridging multiple DRM systems, for bridging multiple CA systems, or for bridging a CA system and a DRM system, in the digital media content distribution systems. Some embodiments of the present invention also provide systems, methods, and apparatuses for managing digital rights in multiple DRM domains in the digital media content delivery and storage systems. Embodiments of the present invention may simplify digital media content delivery, conditional access, and digital rights management and provide for the ability to "upgrade" service from a first CA or DRM system after content has passed through a bridge and is now controlled by a second CA or DRM system.

According to an embodiment, a method is provided for a downstream DRM client to obtain new rights or license from an upgrade server for a digital media content previously acquired from a DRM bridge. The DRM bridge typically includes an original DRM client and a secondary DRM server; it receives media content from the original DRM system and adapts it to the secondary DRM system (e.g. from a secondary DRM server to a secondary DRM client). The rights and license translation in the bridge is performed in such a manner that a remote DRM upgrade server of the secondary DRM system, which has not been involved in the original translation can later issue a new or upgraded license for the same digital media content. The stored media content may be protected by encryption such as, for example, encryption with a control word, which also can be encrypted with a service key. An exemplary method comprises the secondary DRM upgrade server contacting the original DRM system to get authorized to issue new rights or license, and to use the receiving information to upgrade or issue new rights or license to a previously acquired media. The communication between the original DRM and the secondary DRM systems may or may not follow the path of the media content, e.g. passing through the bridge. The original DRM system can be the server that sent the media content across the bridge or can be another server, e.g. a billing server or an upgrade server for the original DRM system. And the upgrade server of the secondary DRM system can be the DRM server that originally issues the license (i.e. the bridge), or another independent DRM server.

In certain embodiments, the client from the secondary DRM system sends a request to the secondary DRM server to get a new license. The secondary DRM server then communicates with the original DRM system to get an authorization to issue new rights and then it transfers the response to the secondary DRM client. The response provides new rights or license for previously acquired media content, to enable the secondary DRM client to access the media according to its request. In some cases, the communication between the secondary DRM server and the original DRM system passes through the original DRM client, thus using the bridge (original DRM client/secondary DRM server bridge) to transmit information. The original DRM client then can communicate with the original DRM server.

In certain embodiments, the secondary DRM server contacts an upgrade server of the secondary DRM system prior to issuing a new license. In some cases, the communication between the secondary DRM server and the upgrade server passes through the original DRM client, thus using the bridge to transmit information. Communication with the upgrade server may be through the original DRM client. The DRM upgrade server then communicates with the original DRM server, or an original DRM billing server to receive a response.

In certain embodiments, the client from the secondary DRM system sends a request to an upgrade server of the secondary DRM system to get a new license. The upgrade server is typically available online to the DRM client, and can communicate with the original DRM system to upgrade the rights or license for the media content. The contacted original DRM system can be an original DRM billing system server, or the original DRM server which sends the media content. The response from the upgrade server can upgrade the media content license according to the client's request.

In at least one embodiment, systems and methods are provided for managing digital rights associated with digital media which are under the protection of multiple DRM systems, e.g. cascading bridges. Certain embodiments of the present invention also provide methods and apparatuses for bridging multiple DRM systems in the digital media content distribution and storage systems. In some embodiments, various methods are used to upgrade rights or license to a media content between a plurality of different DRM systems. The media content is stored in the secondary DRM system, preferably in the secondary DRM client, with the initial secondary DRM license from the DRM bridge.

According to some embodiments of the present invention, the following operations are performed: (a) Contacting, from a secondary digital rights management system, to an original digital rights management system to get authorized to issue a new license or rights for an already acquired media content, (b) Upgrading the license or rights, by the secondary digital rights management system with permission from the original digital rights management system and this upgrading typically occurs by transferring a response from the original digital rights management system to the secondary digital rights management system with regard to the license or rights. The operations according to certain embodiments address potential issues, such as enabling the original DRM to identify, from the secondary DRM system license, the owner and the type of media content so that the original DRM system can properly log and authorize the transaction, and also to securely issue a new license without requiring the original DRM system to re-issue the same media content to the secondary DRM client. For example, the operations according to certain embodiments provide a way to get the CA rules (or other DRM rules) from the original DRM system to the DRM client across the bridge. The media can be originated from a CA system (the original DRM system), where the subscriber and event information may be lost in the bridging and not known to the secondary DRM client. Or the service or content key may not be readable by the server because it is encrypted for use by only the secondary DRM client.

According to another embodiment of the present invention, a method is provided for a secondary DRM system remote server to upgrade the rights or license of a digital media content that were issued by a DRM bridge. The initial secondary DRM license may include additional information to allow the upgrade operation to be reconciled with the original DRM system. The method may comprise the following operations: (a) Sending a request from a DRM client of the secondary DRM system to a secondary DRM server for an upgrade right or license. In some embodiments, the upgrade request goes to the secondary DRM server that originally issued the license (i.e. bridge). In other embodiments, the request is sent to another independent secondary DRM server (b) Having the secondary DRM update server requesting authorization from the original DRM server using the additional information that have been added by the bridge, before completing the transaction. In some cases, when the secondary DRM update server is the DRM bridge, the request can be carried using the original DRM server return path. In some other cases, when the secondary DRM update server is a separate server, the request can be carried as a business to business transaction between two servers. (c) Upon authorization from the original DRM server, having the secondary DRM update server extract the service or content key from the additional information added by the bridge and generating a new license for the secondary DRM client using the same content key but with new rights.

In one embodiment, when the secondary DRM server in a bridge creates the initial secondary DRM license, it may add additional data (i.e. License Renewal Data) to or next to the license for enabling a later update: (a) information that identifies the preferred secondary DRM update server (e.g. URL), (b) information that can be used by the original DRM server to authorize the license update, including subscriber identification (e.g. subscriber ID), device identification (e.g. device ID), media identification (e.g. event ID), targeted DRM client information (e.g. client ID) and schedule information (e.g. Timestamp), and (c) information that is required by the DRM update server to retrieve the current service or content key of the media content. In one embodiment, a portion or the totality of the license renewal data is secured by the secondary DRM system. In another embodiment, a portion or the totality of the license renewal data is secured by the original DRM system. The License Renewal Data may be required to be stored along with the media content in the secondary DRM client, as part of the initial secondary DRM license or next to the secondary DRM license. The association of the encrypted media content with the matching license can be made with a set of clear index numbers that are quasi-unique in the domain of the secondary DRM system. In some embodiments, the information that identifies the preferred secondary DRM update server (e.g. URL) can also include all the other License Renewal data as arguments.

In some cases, the license update request from the secondary DRM client may require the original DRM server to directly or indirectly communicate to the secondary DRM client the multiple options available for the media content (i.e. further playback, unlimited persistence of the copy, burn to a DVD, . . . ) In some cases, the response is delivered to the client through a communication path which is different than the path of the client's request.

In some cases, the license update request from the secondary DRM client may instruct the secondary DRM update server to issue a new license for another device than the secondary DRM client. If the initial secondary DRM license is obsolete or is caused to be no longer valid then this operation corresponds to a registered move, if the initial secondary DRM license still remains valid, then this operation results in a registered content copy.

In some cases, the license update request from the secondary DRM client may instruct the secondary DRM update server to work with the DRM server of a third DRM system to issue a license for a client of the third DRM system. This operation results in a registered content bridge.

Many benefits are achieved by way of the present invention over conventional techniques. For example, the present invention may provide for the original DRM server to be involved in all transactions related to the media content it originally released, even if one or more bridging operations between DRM systems have been performed. The present invention gives control and rights to the original DRM system even when the content has been moved to devices normally out of control of that system. Typically, the originating DRM server does not need to be aware of particular details of how the downstream DRM servers are operated, it does not need to carry the certificates and revocation lists of the downstream DRM systems required to authenticate and revoke the downstream DRM clients, and it does not need to be approved, certified or comply with the robustness and compliance rules of the downstream DRM systems. In some embodiments of the present invention, secure bridging may be accomplished even when relevant DRM systems use different content scrambling schemes. Additionally, the invention may provide a process in which the media content is securely protected by at least one DRM system during bridging, e.g., by providing upgrading service for the content at the source DRM system. Depending upon the embodiment, one or more of these benefits may be achieved. These and other benefits will be described further throughout the present specification.

Therefore, as summarized herein, at least certain embodiments of the present invention provide, among other things, methods for performing an inverted DRM bridge operation where the initial secondary DRM license is required to be sent back to the original DRM server before being modified. Furthermore, some embodiments of the present invention allow for multiple repurposing of bridged media content including but not limited to, the ability to extend the playback rights, enable further copies to be made, export content to other devices and other DRM systems. All these transactions are conditioned on the approval of the original DRM server and as such guarantee the original rights owner to keep control of its assets across heterogeneous DRM ecosystems. For purposes of this description, CA systems are considered a form of DRM systems. It will be understood that the terms "upgrade" and "upgrading" include a change in a license or rights which may be considered a downgrade (e.g., the change restricts certain uses by a customer who reduced their subscription fees). These and other embodiments, features, aspects, and advantages of the present invention will be apparent from the accompanying drawings and from the detailed description and appended claims that follow.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
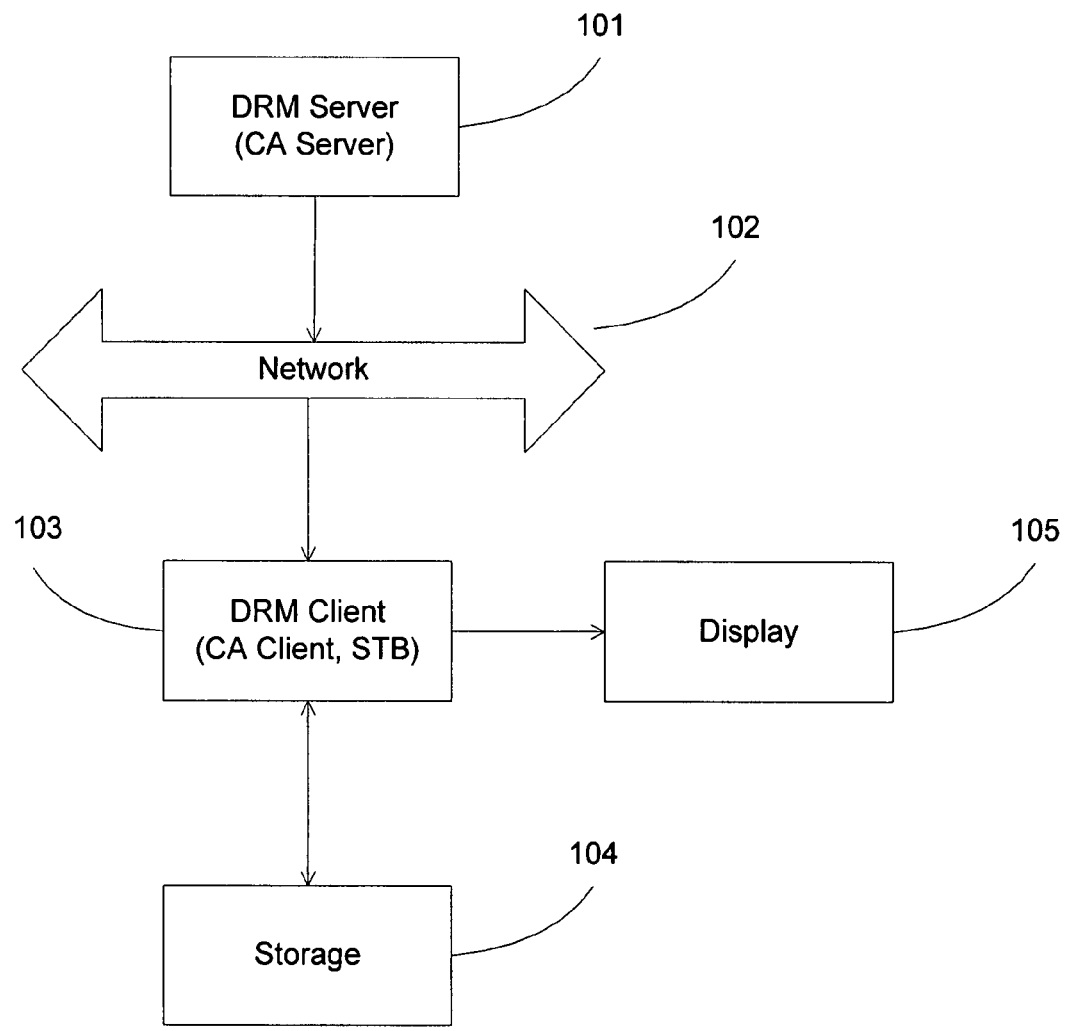
FIG. 1 shows an exemplary DRM environment in which digital media is delivered and managed.
Figure 2:
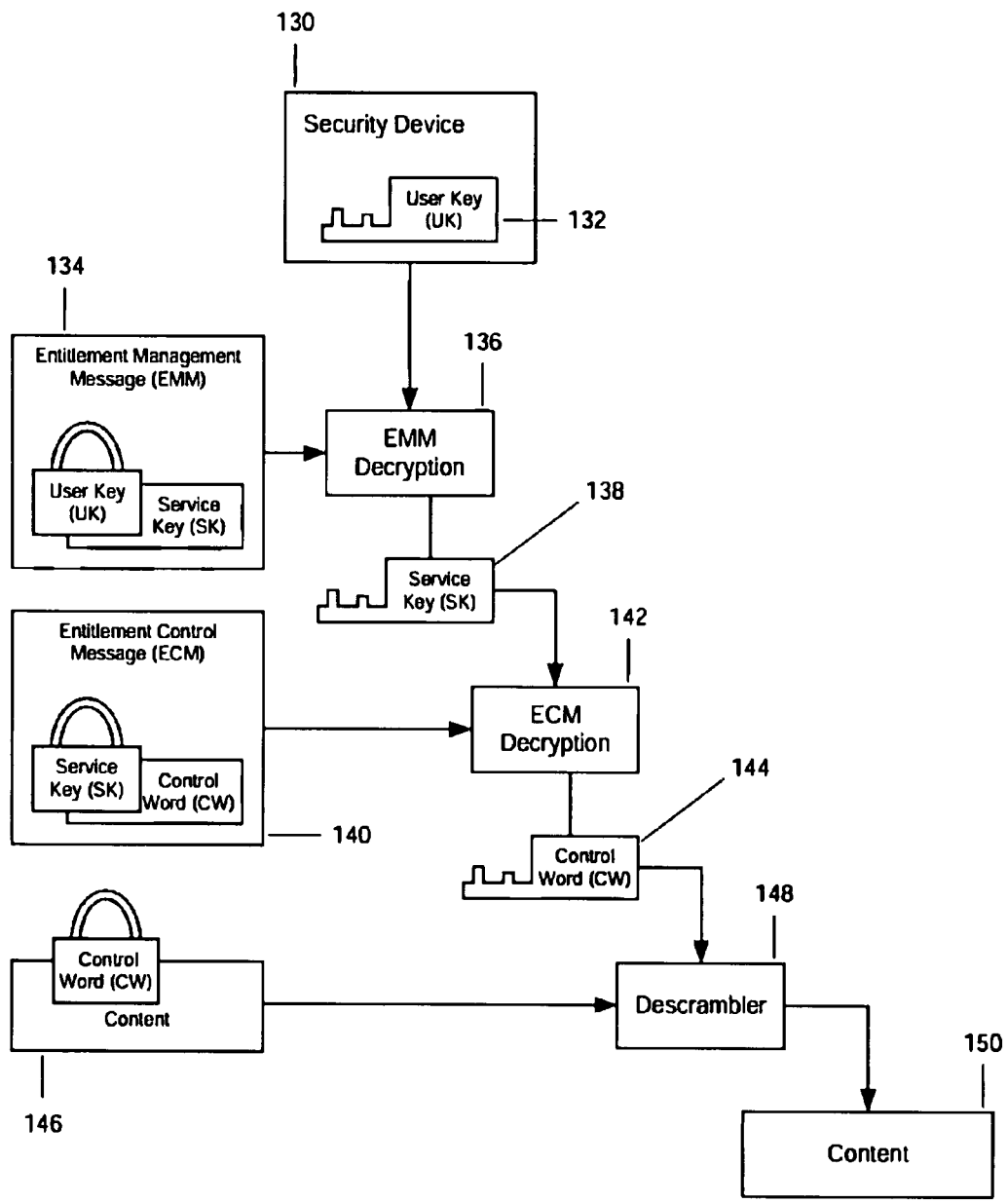
FIG. 2 illustrates various message types used in an exemplary conditional access (CA) system. It shows an entitlement management message (EMM), an entitlement control message (ECM), and a digital media content scrambled (e.g. encrypted) with a control word (CW).
Figure 3A:
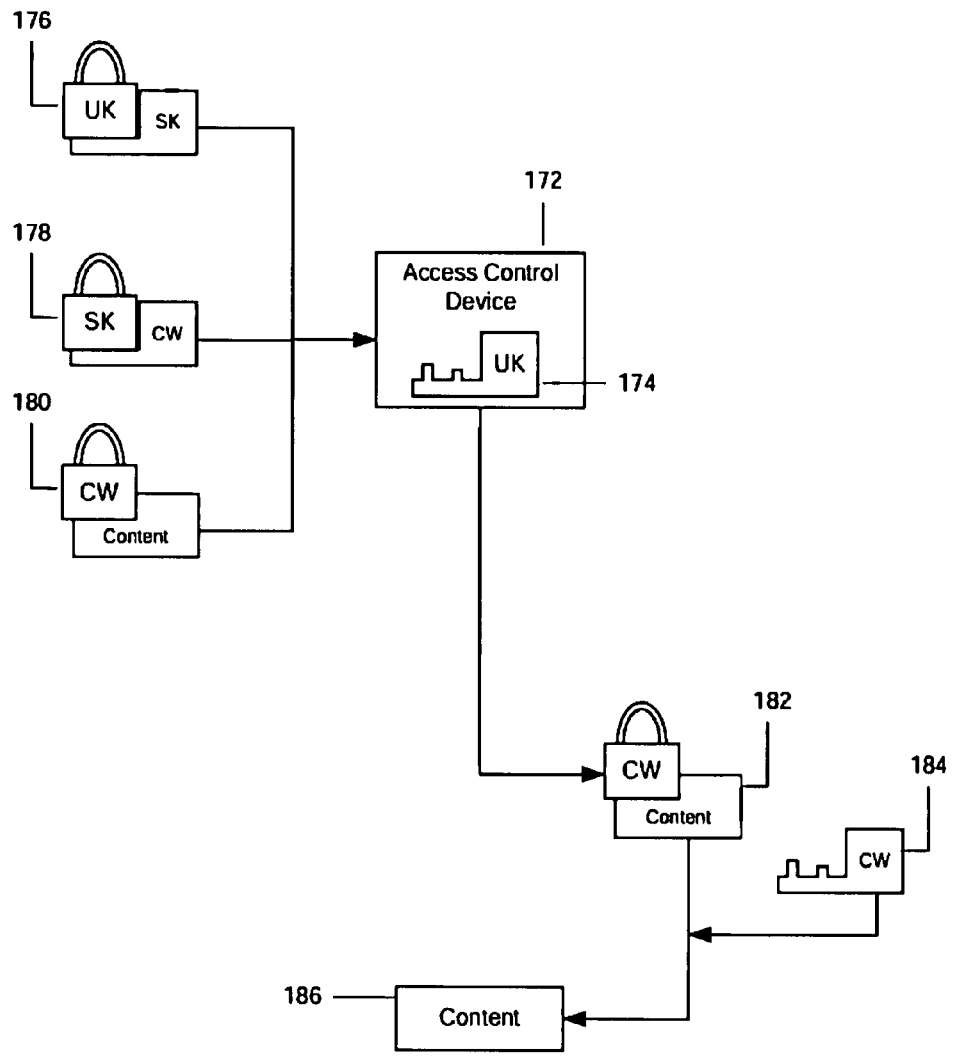
FIG. 3A illustrates an exemplary scenario for protecting the digital media. The figure shows various pertinent messages including a service key (SK), a control word (CW), and scrambled digital media content.
Figure 3B:
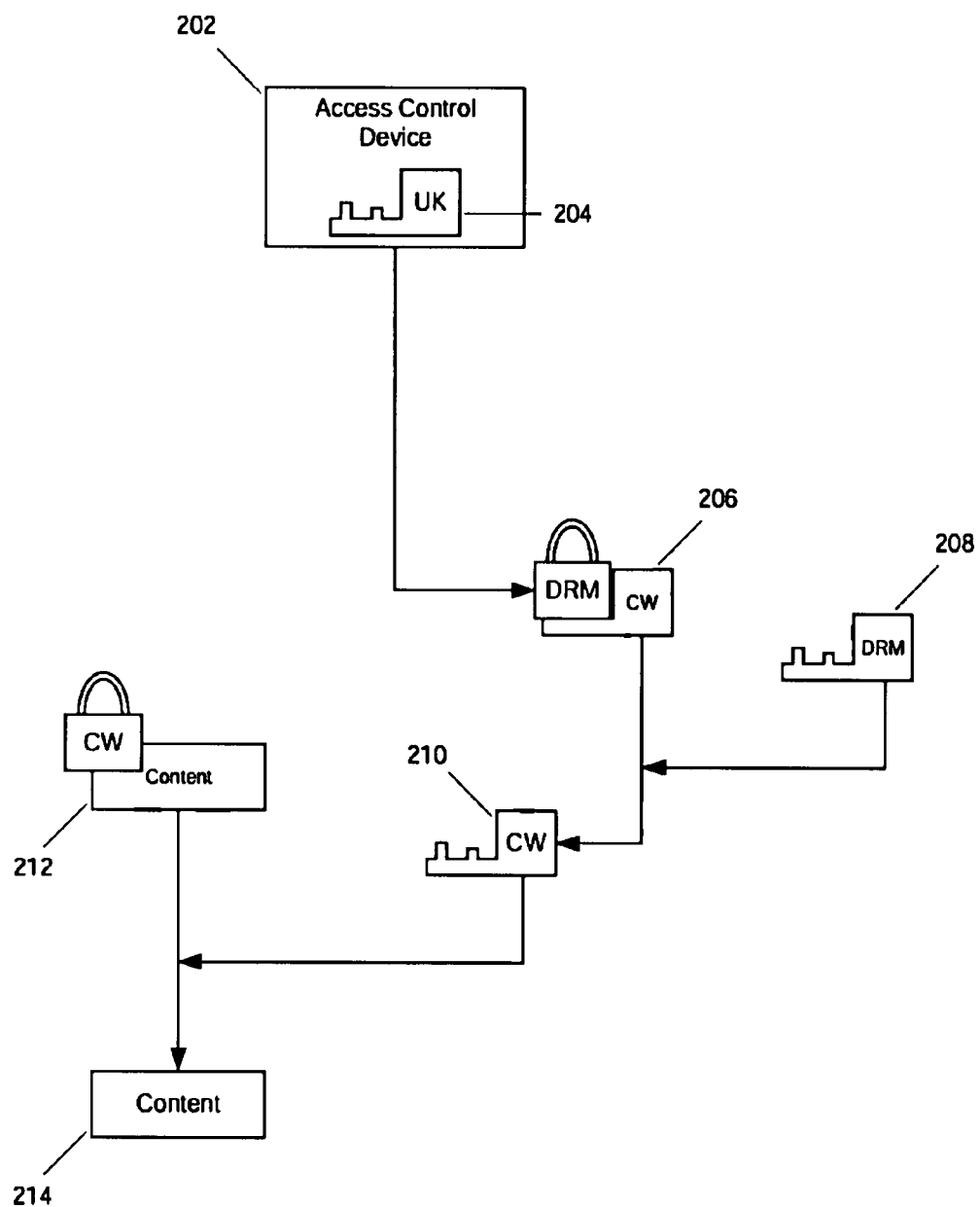
FIG. 3B illustrates another exemplary scenario in which the digital media is protected by a digital rights management (DRM) system.

The present invention will now be described more fully hereinafter with reference to the accompanying drawings, in which various exemplary embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Likewise, for purposes of explanation, numerous specific details are set forth in the following description in order to provide a thorough understanding of the present invention. It will be evident, however, to one skilled in the art that the present invention may be practiced without these specific details. In other instances, well-known structures and devices are shown in block diagram form in order to avoid unnecessarily obscuring the present invention.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiment.

The present invention provides systems, methods, and apparatuses for conditional access and protection of digital media content. Embodiments of the present invention provide methods for managing digital rights under the protection of one or more conditional access (CA) and/or digital rights management (DRM) systems. According to some embodiments, systems and methods are provided for bridging multiple DRM systems in the digital media distribution and storage systems, providing communication between the multiple DRM systems so that a media content encrypted by an original DRM system can be assessed by a secondary DRM system. The media content is usually protected by encryption algorithms from the original DRM system, with the encryption reflecting certain rights or license of the media imposed by the original DRM system. The communication between DRM systems provides a secondary DRM system with access so that by passing a bridge or boundary between the two DRM systems, the original rights or license to the media content can then be converted into new rights and license of the secondary DRM system based on the terms and conditions applicable at the time of the bridge translation. However, there is often a need for the DRM bridge to be able to further update the secondary DRM system content license over time if the terms and conditions have changed. One example will be a CA system authorizing the playback of recorded media content under the protection of a secondary DRM system, only as long as the original CA subscription is maintained. In this case the original license issued by the DRM bridge may not allow any playback rights. The process consists of a request to the DRM bridge for an updated license authorizing playback by the secondary DRM system. Another example will be a CA system that would like to up-sell the right to perform certain operations on a piece of content (i.e. up-sell the right to burn the content to a recordable DVD) once the content has been viewed. The control across a bridge allows the original DRM system to seamlessly distribute media contents to a secondary DRM system without exposing the content to unauthorized uses. The control across a bridge further allows a client of a secondary DRM system to seamlessly access, e.g. upgrade rights or license, a media content provided by an original DRM system. In certain embodiments, the media content across a bridge is protected by both DRM systems, where the original DRM system provides old rights and license to the media content, and the secondary DRM system provides upgradeable access to the rights and license.

With reference now to FIGS. 5-14C, various embodiments of the present invention are described in detail. FIGS. 5A-5D illustrate exemplary contexts in which some of the embodiments of the present invention can be practiced. In FIG. 5A, a schematic representation of two exemplary digital rights management (DRM) systems, 522 and 534, are depicted. Each DRM system is symbolically represented by its encryption and decryption keys. More specifically, the DRM system 522 comprises encryption keys 524 and 528 and their corresponding decryption keys 526 and 530, respectively, and the DRM system 534 comprises encryption keys 536 and 540 and their corresponding decryption keys 538 and 542, respectively. In the case of cable TV broadcasting, the first pair of encryption and decryption keys (e.g., 524 and 526) represents service keys (SK), and the second pair (e.g., 528 and 530) represents control words (CW). Control words are used to scramble and/or descramble digital media content. In some embodiments, symmetric key cryptography may be used for certain tasks or functions. In such a case, one or more pairs of encryption and decryption keys may be identical or otherwise equivalent (in computational sense) to each other. For example, if symmetric key cryptography is used in DRM system 522 for scrambling digital media content, then the keys 528 and 530 are essentially identical. In some cases, encryption key 528 may be derived from decryption key 530, but not vice versa. In some embodiments, content encryption (e.g., scrambling media content with control words) is done using symmetric key cryptography and key encryption (e.g., encrypting control words with service keys) is done using asymmetric key cryptography. In general, encryption/decryption schemes based on symmetric key cryptography are computationally less expensive than those using asymmetric key cryptography.

Figure 4A:
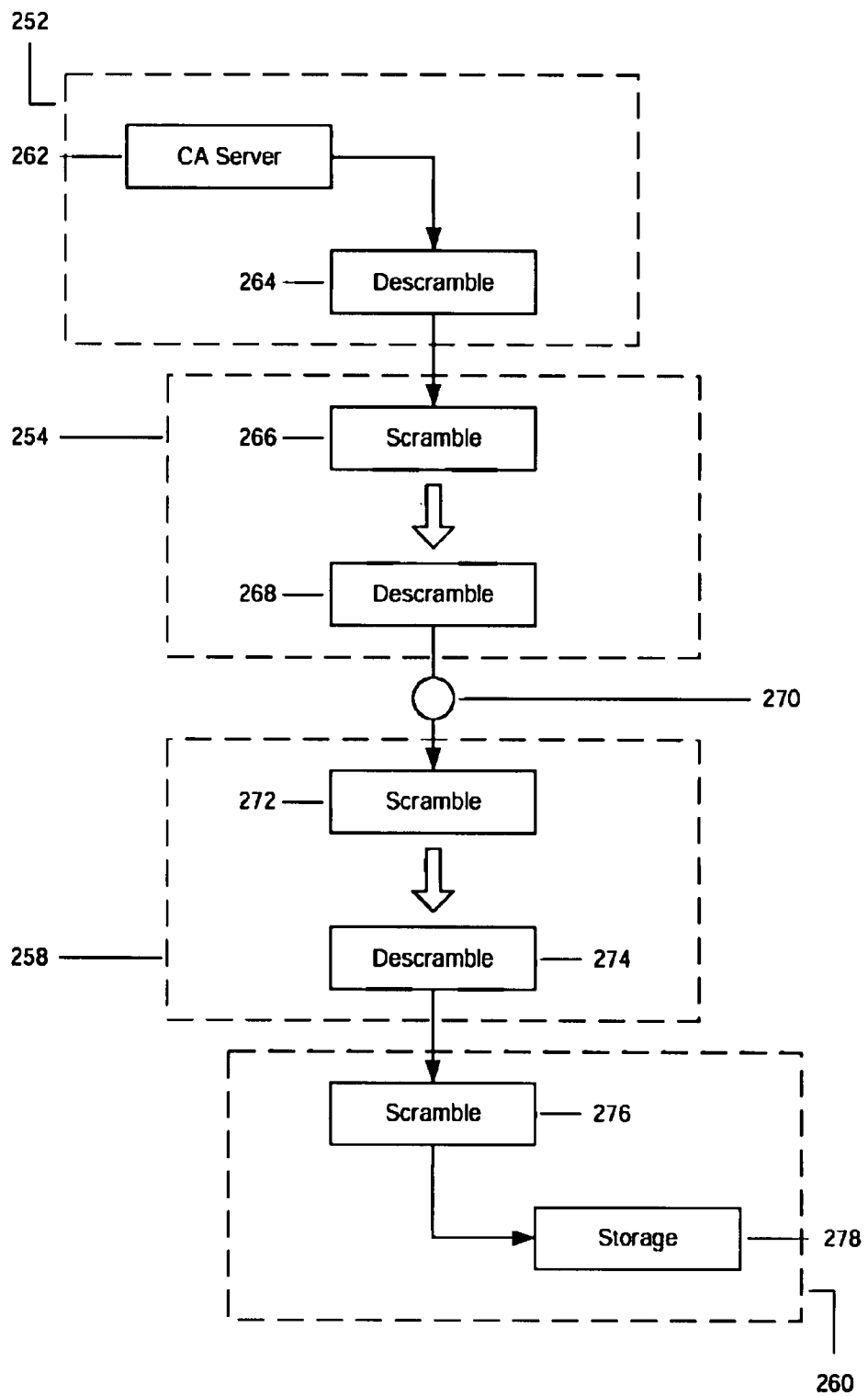
FIG. 4A illustrates an exemplary context where more than two CA and/or DRM systems are employed to protect digital rights. The figure includes a CA server and three DRM systems.
Figure 4B:
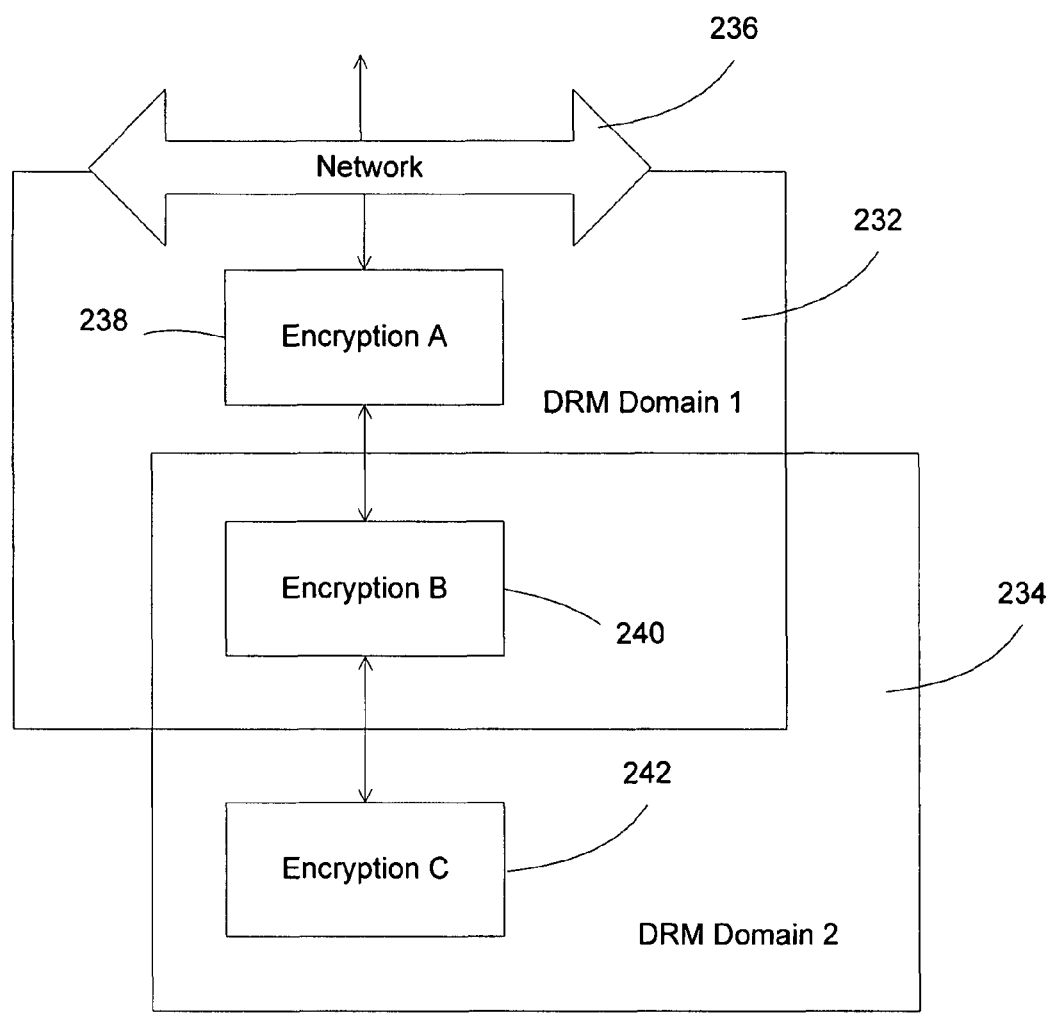
FIG. 4B illustrates an exemplary context where multiple DRM domains exist to protect the same digital media. The figure shows three DRM content stages protected by combinations of two DRM domains.
Figure 5A:
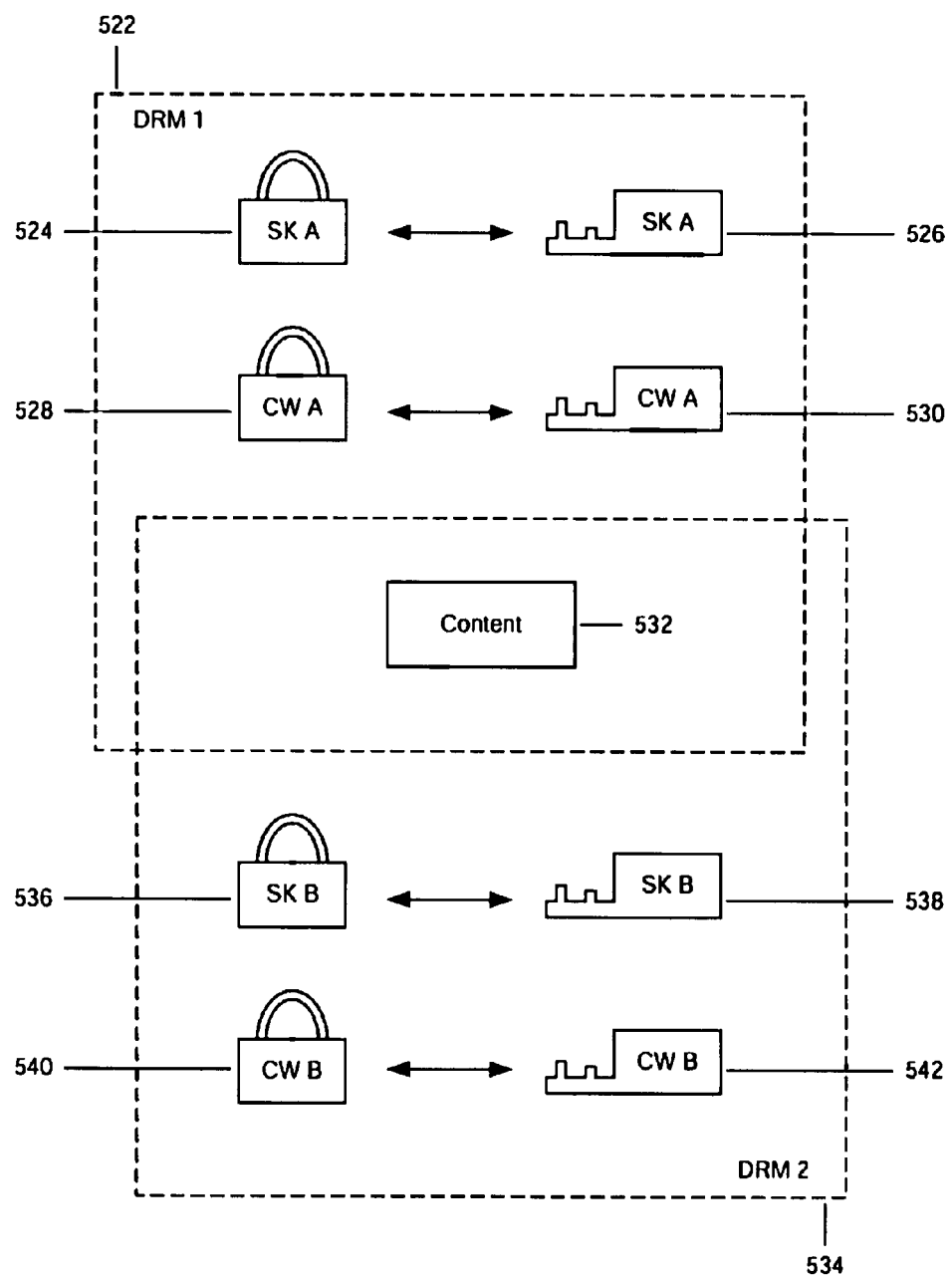
FIG. 5A is a schematic representation of two exemplary digital rights management (DRM) systems. The figure also shows the pertinent encryption and decryption keys associated with each DRM system. The digital media content is protected by either or both DRM systems in this example.

FIG. 5A also shows digital media content 532 which may be under the protection of the first DRM system 522 or the second DRM system 534, or both. These two DRM systems may be employed for protection of the digital media either at the same time or alternately at different times or at different stages of delivery and processing. For example, the digital media owners such as movie studios and media distribution services such as cable network companies might utilize different and separate DRM systems (e.g., 522 and 534) for the same digital media, or for different parts of the same media. This has been illustrated, for example, with respect to FIGS. 4A, and 4B. In the example shown in FIG. 5A, the digital media 532 delivered, for example, from a conditional access server (not shown in the figure) may first be protected by the first DRM system 522, which may be managed by the CA server, for example, associated with a cable company. In order to play the delivered content or to obtain additional rights not already received, the user may need to get proper access permission from both the CA system 522 and the DRM system 534. Suppose now that the digital media content has been played and stored for later viewing. The stored content may then be placed under the protection of the second DRM system 534, which may be managed, for example, by a movie studio who has the copyright on part or all of the stored digital media or by a certain content management device or software. In certain embodiments, the stored content may still be protected by the first DRM system 522 together with the second system 534. In certain embodiments, at some point during the media delivery, processing, playing, and storage processes, the protection by the first DRM system 522 may be removed and the stored digital media 532 may be protected only by the second DRM system 534. In this type of application, the first DRM system 522 will be considered more "global" (e.g., closer to the distributor of the digital media) whereas the second DRM system 534 will be considered more "local" (e.g., closer to the consumer of the digital media).

Figure 5B:
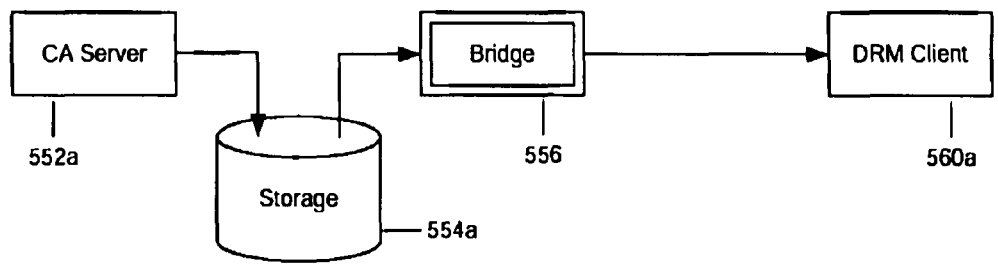
FIG. 5B-FIG. 5D illustrate exemplary contexts where two DRM/CA systems are used to protect digital rights associated with digital media. The bridge shown in the middle of each figure divides the system into two regions. On the left-hand side, the media is protected by a CA system, whereas on the right-hand side, the media is under the protection of a different DRM system. In a typical application, the bridge is a DRM server relative to the DRM client and is a CA client relative to the CA server.
Figure 5C:
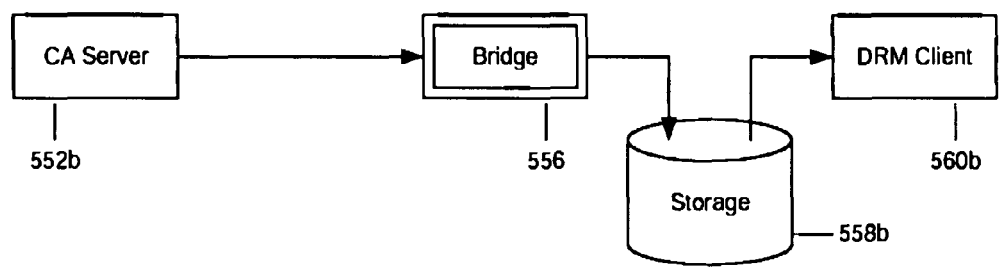
Figure 5D:
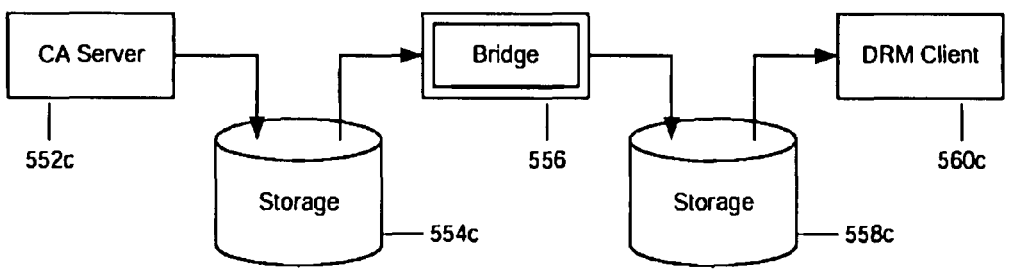

This is further illustrated in FIGS. 5B-5D with regards to different examples. The drawings illustrate exemplary contexts where two DRM/CA systems are used to protect digital rights associated with digital media as in the example of FIG. 5A. The bridge shown in the middle of each figure divides the system into two regions. On the left-hand side, the media is protected by a CA/DRM system, whereas on the right-hand side, the media is under the protection of a different DRM system. A bridge will typically include a CA client (or DRM client for a first DRM system) and a DRM server (for a second DRM system); the CA client is a client relative to the CA server, and the DRM server is a server relative to the second DRM client. The first DRM system (i.e., the left-hand side CA server in the figures) and the second DRM system may be associated with control words 528/530 and 540/542 of FIG. 5A, respectively. It should be noted that more than one (pair of) control word (and/or more than one service key) might be associated with each DRM system even though it is not explicitly indicated in these figures. As stated earlier, in some systems such as those used in the cable TV broadcasting, the typical lifetime of a control word is of the order of 0.1 second or 1 second. Referring back to FIGS. 5B-5D, a DRM bridge 556 is shown in the middle of each figure. On the left hand side of the bridge, the digital media is delivered from a CA server, 552. On the right hand side, it is consumed by a client (e.g., associated with a DRM client, 560). FIG. 5B depicts a scenario where the digital media content is delivered by CA server 552a and is further protected by the same CA server. The media is stored on a storage 554a, such as a set-top box or a computer or a media entertainment system or other data processing system, on the left hand side of the bridge. In this particular scenario, the second, or "local", DRM system (e.g., indicated by DRM client 560a in the figure) relies on the CA server 552a to enforce the digital rights including those related to storage and those related to other content operations downstream from the DRM bridge. A DRM client may need to contact the CA server to access the media if the initial rights and license exceed those provided during the bridge operation. In FIG. 5C, on the other hand, the media content delivered from a CA server 552b is stored on a storage, such as a personal computer, on the right-hand side of the bridge 556. It should be noted that the bridge typically includes a DRM server and a CA client. In these examples, the bridge 556 plays the role of "local" DRM server protecting digital media on the right hand side (e.g., consumer side). In this scenario, the local DRM system (e.g., the bridge 556) enforces the digital rights protection for the media content stored in the storage 558b. However, for the CA server to retain control of the media, it is encrypted with certain rights and license from the CA rules, which can be upgraded with request from the DRM client. FIG. 5D illustrates yet another example, in which the digital media content is stored in more than one device. For example, storage 554c may be a personal computer or a DVR (digital video recorder), and storage 558c may be a mobile device. Then the bridge 556 may be a part of "sync" agent enforcing digital rights protection. In this example, the media content is first delivered by a CA server 552c, stored in 554c, and further protected by the same CA system (or by a different DRM system). When a user "copies" the media content to a different device/storage 558c under the protection of a different DRM system on the "local" side, the bridge 556 is involved. Then, the media can be played or otherwise consumed, in compliance with the proper rights, "locally" without the need to access the original DRM or CA server (e.g., 552c). The proper rights can be upgraded with request from the DRM client to the proper DRM server system.

When the digital media is passed from one DRM system to another DRM system, the media (and its associated keys) may be descrambled/decrypted using the keys from one DRM system (e.g., 552) and rescrambled/encrypted using the keys from the next DRM system (e.g., 556 and 560). In the examples illustrated in FIGS. 5B-5D, the media under the protection of the first DRM system and/or a CA server is descrambled and scrambled again for the next DRM system, for example, in the bridge 556.

Whenever the media crosses boundaries of different DRM systems, old rights or license are translated into equivalents rights and license for the local DRM based on the terms and conditions that are in force at the time of the transaction. Thus the present invention provides means and methodology for the local DRM client to contact the original DRM to upgrade later on the rights or license of the media. In the following, with reference to FIGS. 6-14, various exemplary embodiments of the present invention are presented, some of which address this upgrade issues at or around the bridge points. The following examples will be explained in the context of two DRM systems. As will be evident, however, to those skilled in the art, embodiments of the present invention may be practiced with more than two systems for digital rights protection.

Figure 6:
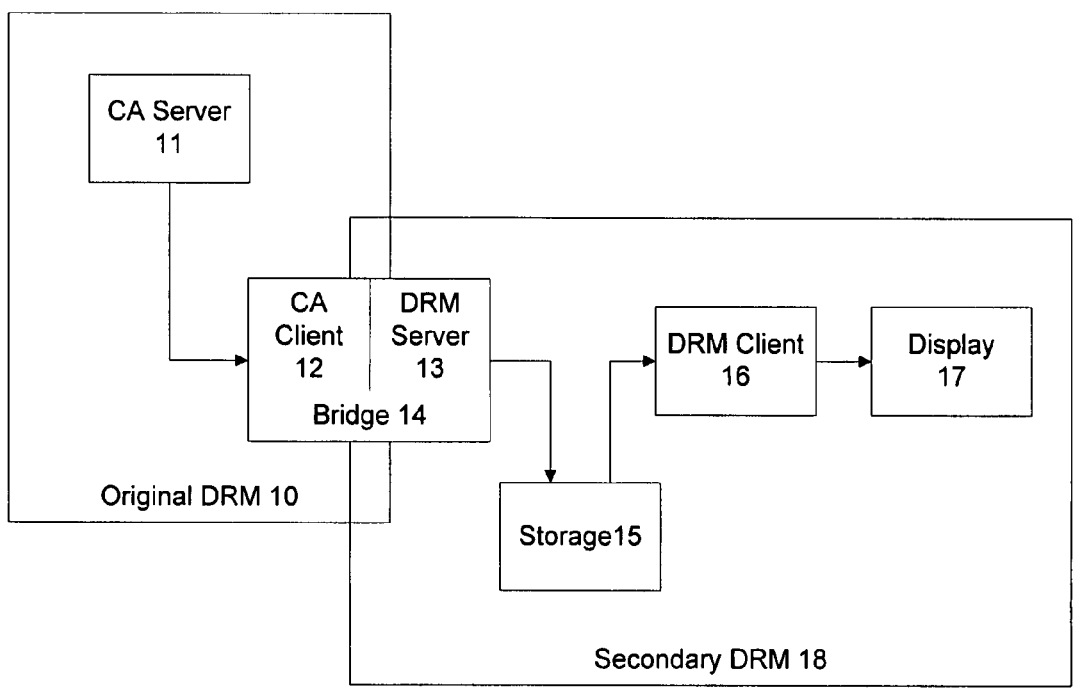
FIG. 6 illustrates an exemplary context where the invention is used in two DRM/CA systems. The media, protected by the CA system, crosses the bridge to be stored in the DRM system and protected by the DRM system.

Referring now to the following figures, various aspects of certain embodiments of the present invention are illustrated. FIG. 6 illustrates an exemplary embodiment of the present invention covering two DRM systems 10 and 18. The drawing illustrates an original DRM system 10, comprising a CA server 11 and a CA client 12, providing a media content, through a bridge 14, to a secondary DRM system 18, comprising a DRM server 13, a storage 15, a DRM client 16, and a display 17 for the DRM client. A bridge 14 exists between the two DRM systems, and the bridge 14 includes a CA client 12 and a DRM server 13. In this embodiment, a media content is delivered from the CA server 11, across the bridge 14 to be stored on the storage 15, under the control of the local DRM system. The bridge could be a super scrambling bridge, a transcrambling bridge, a common scrambling bridge, a simulcrypt bridge, or an overscrambling bridge. Once stored the media content is under the protection of the local DRM system and as such no more subjected to the control of the CA server 11. The invention, in an embodiment, defines a method for the content to be repurposed by the CA system once it has been bridged to the local DRM. For example, the CA media content may include various CA rules, such as a viewer can record the content, but the viewer must be verified to have a current subscription when trying to play back from a recorded content. Another CA rule can be that a viewer can record once and watch without paying but can only make a copy if paying a predetermined amount (e.g. $3.99) for each extra copy. Other CA rule can be that a viewer can record once but can only play back after paying a predetermined amount to watch the content. Other CA rule can be that a viewer can record once and can play for e.g. 30 days and can extend the viewing time (e.g. unlimited use beyond 30 days) if paying a predetermined amount (e.g. $3.99). Still another CA rule can be that the viewer can record once, and can play in a certain location, e.g. the living room, but can play only in other locations, e.g. the bedroom, after paying a predetermined amount (e.g. $3.99).

The present invention in certain embodiments, addresses the issue of how the DRM system will be authorized by the CA system to update the rights and the license of an already delivered piece of media content. Specifically, the bridge will need to include additional data (e.g. License Renewal Data) into the original DRM license, so that upon license update request, the data can be used to reconcile the transaction with the CA server and update the license applicable to the already delivered piece of media content. Upgrading rights and license also may mean providing new rights and license for media content without any previous rights or license.

The present invention discloses methods, in certain embodiments, to be able to modify or upgrade the original secondary DRM License long after it has been issued but still under the rules of the original CA server or DRM system. The CA media content is typically stored on the DRM client, together with the original secondary DRM License. Both content and license are related by the use of a common index. The index can be a pointer or a number attached to the content and license (e.g. subscriber ID and event ID), and thus can effectively identify the content and license of the media. The index can be used to find the DRM license to decrypt the content.

When the secondary DRM server, in the bridge, creates the original secondary DRM license, it also adds the License Renewal Data. In some embodiments, the License Renewal Data is part of the original secondary DRM License, in some other embodiments the data consists of an independent object that is cryptographically related with the original secondary DRM license and the encrypted content. The License Renewal Data is then stored, at the DRM client, along with the original secondary DRM license and the scrambled content. The License Renewal Data can include a subscriber ID, an event ID, and a service key. The secondary DRM client can pass the encrypted License Renewal Data back to the CA server through the secondary DRM upgrade server in order to get the new rights. The DRM client can also pass the encrypted License Renewal Data back to the CA server through the DRM server in the bridge.

In the bridging scheme of media transfer at least certain embodiments of, the present invention also provide solutions to consolidate billing statements when the updated rights require a new transaction, and to recover content even in the case when the secondary DRM client has crashed and may have lost some of its licenses.

Figure 7A:
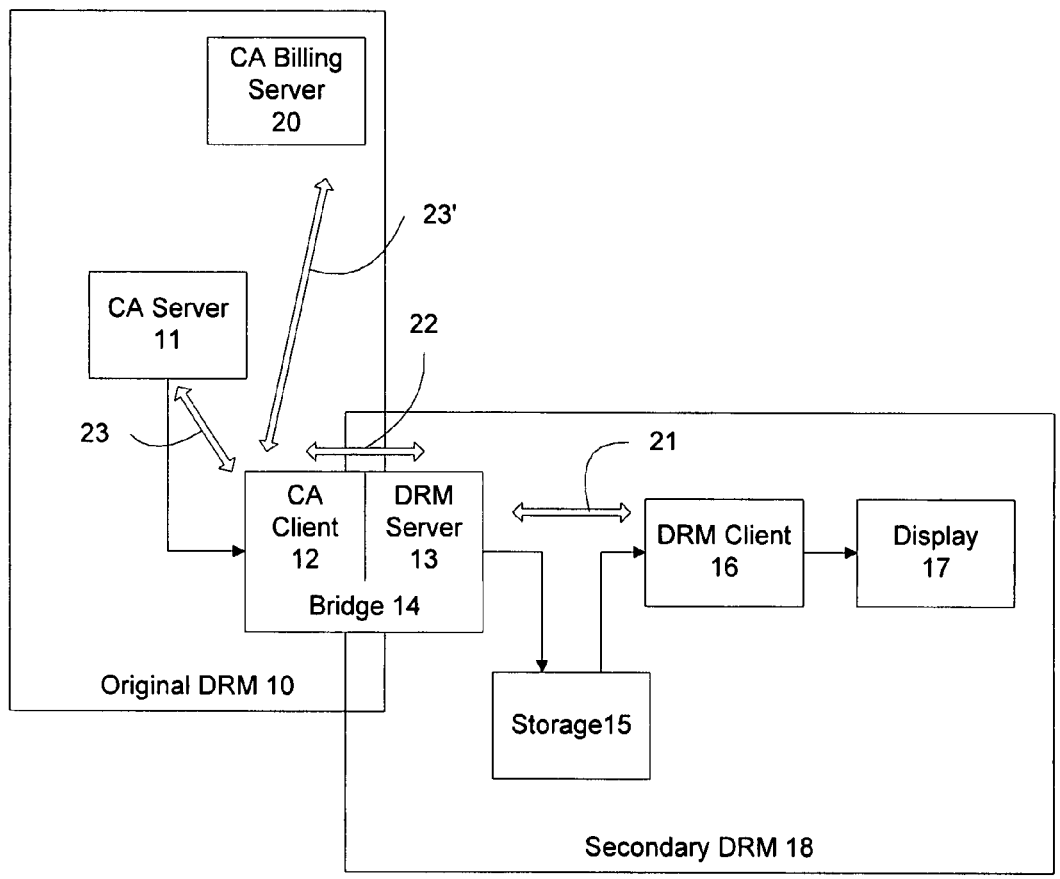
FIGS. 7A-7C illustrate various exemplary communication paths for the Secondary DRM Client to contact the original DRM system for upgrading the media rights or license.

FIG. 7A shows an embodiment of the present invention where a media content from a CA server 11 passes through a bridge 14 to be stored in a storage 15, controlled by a DRM client 16. The exemplary method comprises the secondary DRM system to contact the CA system to get new rights or license for the already recorded media content. FIG. 7A shows an embodiment of the communication paths for the secondary DRM client to upgrade the rights or license of the media content, which includes a communication path 21 between the secondary DRM client 16 and the DRM server 13 within the bridge 14; a communication path 22 across the bridge 14, between the DRM server 13 and the CA client 12; a communication path 23 between the CA client 12 and the CA server 11; and an alternative communication path 23' between the CA client 12 and CA billing server 20. The CA billing server 20 can be a CA upgrade server, acting for upgrading rights or licenses for the CA system. In an embodiment, to upgrade the rights or license of the media, the DRM client 16 contacts either the CA server 11, or a CA billing server 20 to receive an upgrade response. The CA server 11 is the server sending the media, and the CA billing server is another CA server, responsible for collecting royalty or payments from the CA Server transactions. The connection between the CA Server and the CA Billing Server is not shown. A typical connection path for the request includes a request from the DRM client 16 sending to the DRM server through the communication path 21; then the DRM server passing the request through the reconstruction of the bridge 14 to the CA client 12 (path 22); and then the CA client 12 passing the request to either the CA server 11 through the communication path 23 or the CA billing server 20 through the communication path 23'. The DRM client then receives a response for upgrading the media content through a reverse path. In some embodiment, the CA client may have preemptively received authorization from the CA server to update the secondary DRM license, and as such the communication paths 23 and 23' are not used.

Figure 7B:
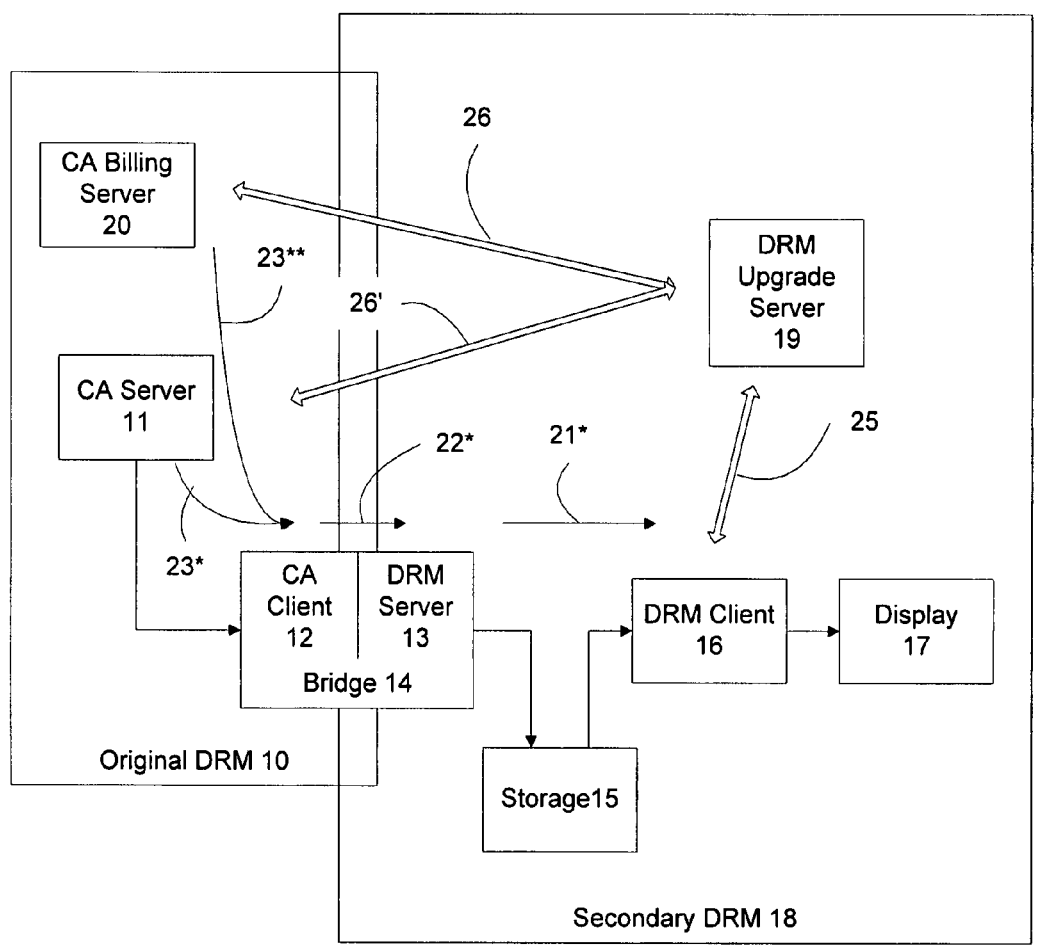

FIG. 7B shows another embodiment of the present invention. An exemplary method comprises the DRM system contacting a DRM upgrade server 19, which then contacts a CA billing server 20 or a CA server 11 to get new rights or license to the media content. FIG. 7B shows an embodiment of the various communication paths for the DRM client to upgrade the rights or license of the media content, which includes a communication path 25 between the DRM client 16 and the DRM upgrade server 19, and a communication path 26 between the DRM upgrade server 19 and the CA billing server 20. Alternatively, the communication path 26 can be replaced with a communication path 26' between the DRM upgrade server 19 and the CA server 11. In an embodiment, a DRM upgrade server 19 is provided to upgrade the rights or license of the media according to the request from the DRM client 16. The DRM client 16 then can contact either the CA server 11, or a CA billing server 20 through a DRM upgrade server 19 to request upgrading the media content. A typical connection path for the request includes a request from the DRM client 16 sending to the DRM upgrade server 19 through the communication path 25; then the DRM upgrade server 19 passing the request to either the CA server 11 through the communication path 26' or the CA billing server 20 through the communication path 26. The DRM client then receives a response for upgrading the media content through a reverse path, such as path 26 to path 25 or path 26' to path 25. The reverse path does not have to be the same as the forward. For example, the response can be sent through a different return path such as the return path shown in FIG. 7A. The different return path can be the path 23* or 23** from the CA server 11 or the CA billing server 20, respectively, to the CA client 12; then path 22* through the bridge 14, from the CA client 12 to the secondary DRM server 13; and finally path 21* from the secondary DRM server 13 to the secondary DRM client 16. This embodiment simplifies the upgrade communication, employing a DRM upgrade server and/or a CA billing server. In at least certain embodiments, the DRM upgrade server 19 contacts either the CA billing server 20 or the CA server 11 for the upgrade, and this may cause the CA billing server 20 and the CA server 11 to communicate between each other to, for example, synchronize their information with respect to the upgrade of the media (e.g., the type of upgrade, the account and media upgraded, etc.). In some embodiments, the DRM upgrade may have preemptively received authorization from the CA Server or the CA Billing Server to update the DRM license, and as such the communication paths 26, 26' or the return path 21 *, 22*, 23* or 23** are not used.

Figure 7C:
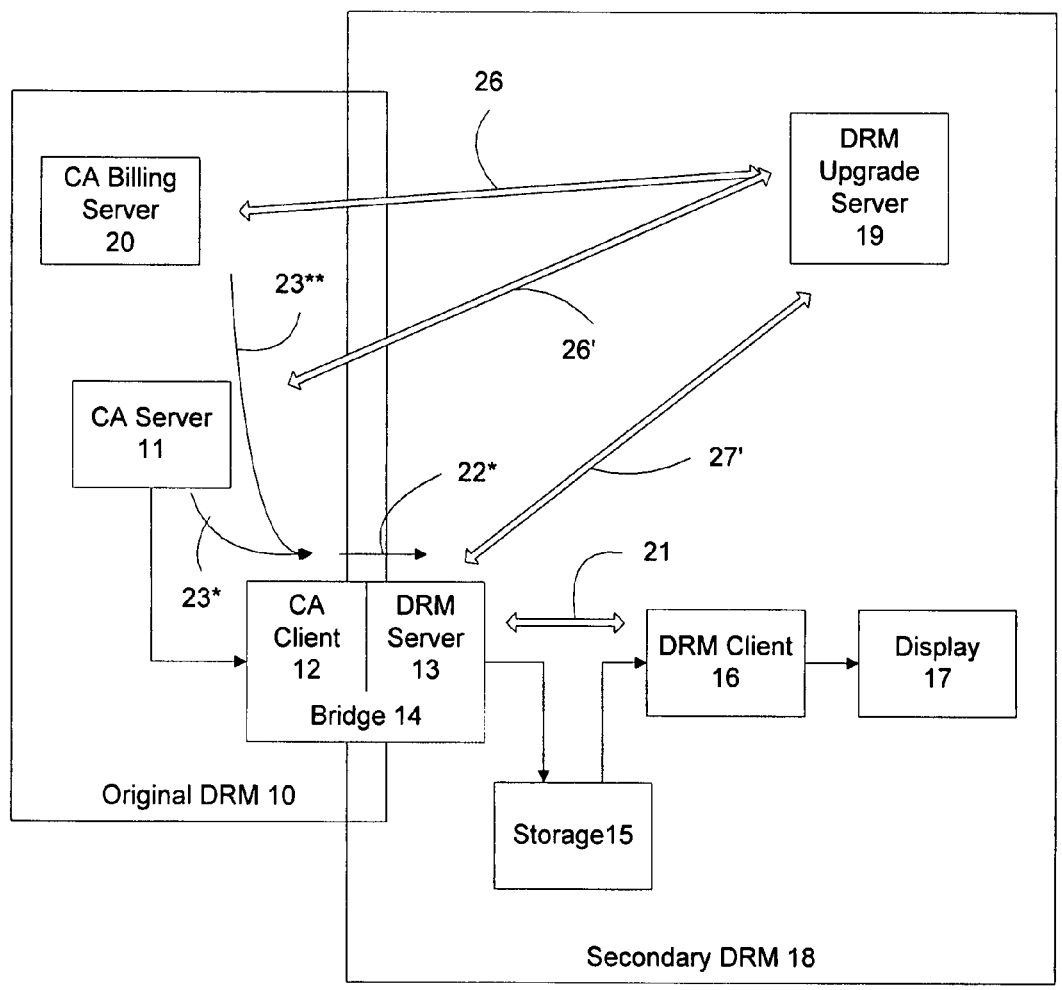

FIG. 7C shows another embodiment of the present invention. The exemplary method provides an alternative communication path for the DRM client 16 to contact the DRM upgrade server 19. The alternative communication paths comprise a path 21 for the DRM client 16 with the DRM server 13, and a path 27' for the DRM server 13 to the DRM upgrade server 19. The communication from the DRM upgrade server with the CA system can pass through the path 26 or 26' as discussed in FIG. 7B above. Further, the return path can be a reverse path, i.e. tracing back the forward communication path. The return path can be a different path, such as the path 23*/23**, 22*, and 21* as discussed in FIG. 7B above.

Figure 8:
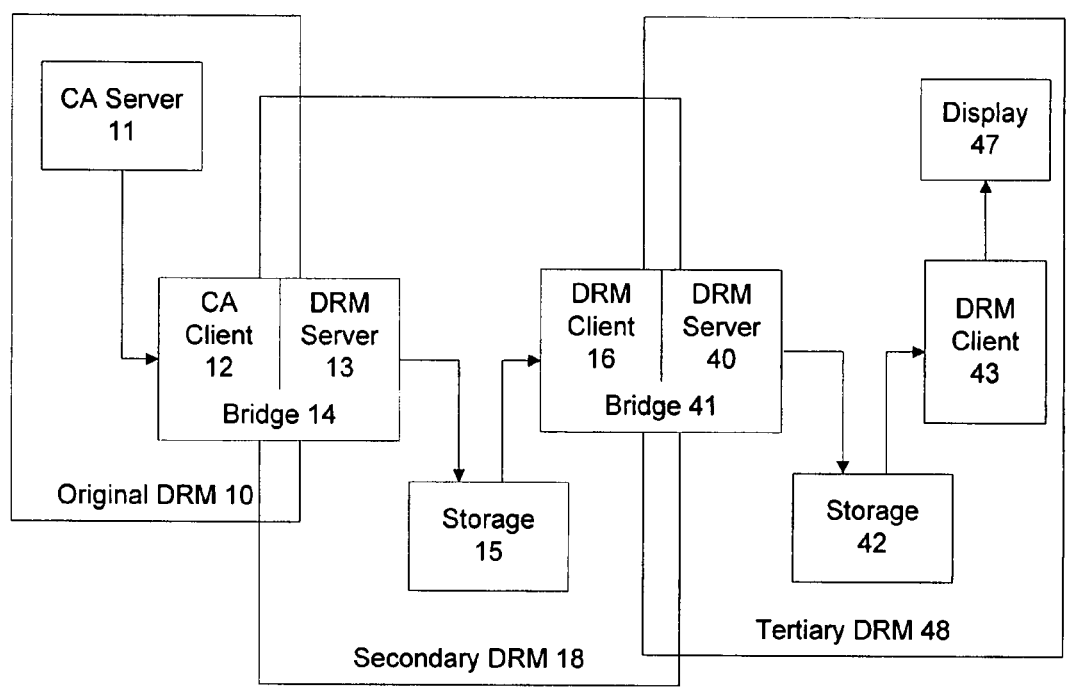
FIG. 8 illustrates an exemplary context where the invention is used in three cascade DRM/CA systems. The media, protected by the CA system, crosses a plurality of bridges to be stored in a DRM system.

FIG. 8 shows another embodiment of the present invention for multiple DRM systems. The exemplary multiple DRM systems comprise an original CA system 10, passing through a bridge 14 to a secondary DRM system 18, then through a bridge 41 to a tertiary DRM system 48. The media content generated from the original CA server 11 can pass through the bridge 14 to be stored in the storage 15, or can further travel across the bridge 41 to be stored in the storage 42. DRM client 16 or DRM client 43 can contact the original CA system to request this media content. In general, a license update is needed to authorize a bridge transaction, thus the media content stored in storage 15 from the DRM client 16 would need permission or license from the original CA system 10 to be able to cross the bridge 41 to reach the DRM client 34. In one embodiment, DRM client 16 may need to modify the original secondary DRM license to authorize the bridge operation to the third DRM system.

Figure 9:
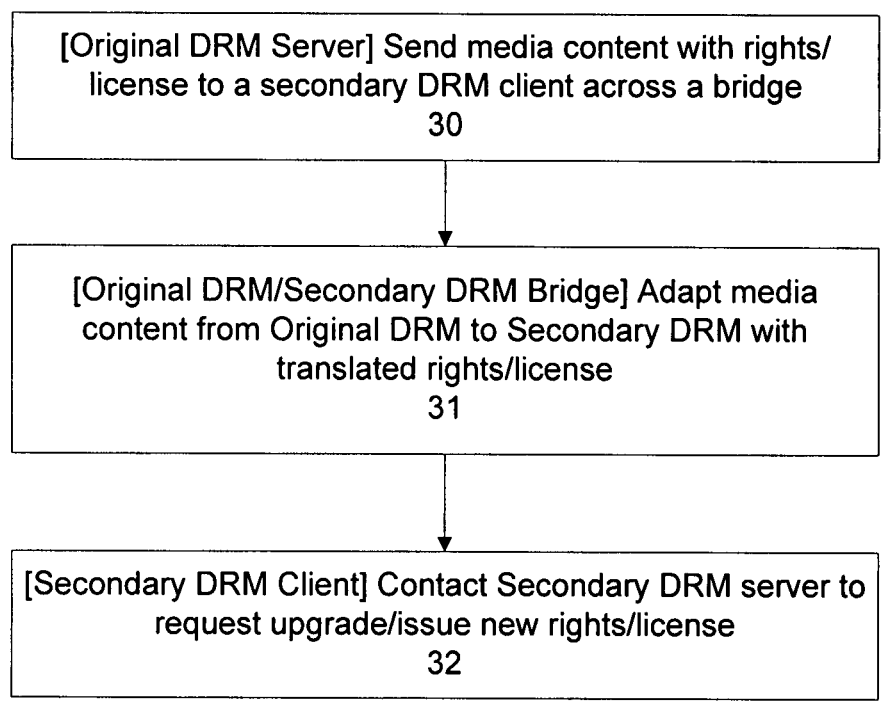
FIG. 9 illustrates an exemplary process according to certain embodiments of the present invention as a flow chart. The process shown in the flow chart comprises two operations which may be performed by two distinct entities.

Various exemplary methods according to embodiments of the present invention are now shown in FIGS. 9-10 as flow diagrams. FIG. 9 illustrates an overall process according to embodiments of the present invention. The flow chart shows three operations performed, possibly, by two separate DRM entities, an original DRM server and a secondary DRM server/client. According to the process shown in the flow chart, an original DRM server sends a media content with original rights and/or license to a secondary DRM client across a bridge of the original DRM/secondary DRM, at 30. The media content, together with the original rights and license is translated across the bridge, at 31, in a manner to allow the secondary DRM server to upgrade the original license or issue new rights, preferably with the permission from the original DRM system. The translated rights or license can include information to identify owner and types of media to allow the original DRM to log and authorize an upgrade request. Further information such as License Renewal Data can be added to the acquired content to aid the upgrading process, for example, to reconcile with the original transaction, to help the original DRM to find the original license. The additional data can be secured by the original or the secondary DRM system. The License Renewal Data may be included in the license or cryptographically linked to it. The License Renewal Data may include subscriber identification data, event identification data, time stamp, device identification data, renewal traceability data, restore data. The License Renewal Data can also include encrypted content key.

The upgrading service that the secondary DRM server can perform may include extending the lifetime of the license, enabling new rights such as additional copies, enabling new exports such as additional bridging, enabling move operations or restoration of all licenses for another machine. The operation of the secondary upgrade server can be silent or require a user dialog. In an exemplary silent operation, the upgrade server can retrieve stored information such as payment type, and perform the upgrade without a client dialog. In an exemplary dialog operation, the upgrade server prompts a dialog with the client, and receives needed information to perform the request.

The secondary DRM client then requests new rights or license, at 32, for example, as shown in FIGS. 7A-7C. The request is then sent to the original DRM server, and after processing, the original DRM transmits a response. The response is processed to enable the secondary DRM to upgrade the media content according to the request. In some embodiments, the request comprises the reference to the media, the old rights or license, and the newly requested rights or license. In certain cases, the request comprises License Renewal Data, included or linked to the original License. In some embodiments, the transmitted response comprises the new rights or license to the media content.

In some aspects, the original license is extracted and sent back to the original DRM system before being modified. The secondary DRM server, upon receiving authorization from the original DRM system, can extract the service or content key, and then generate a new license for the secondary DRM client using the same content key but with new rights.

Figure 10A:
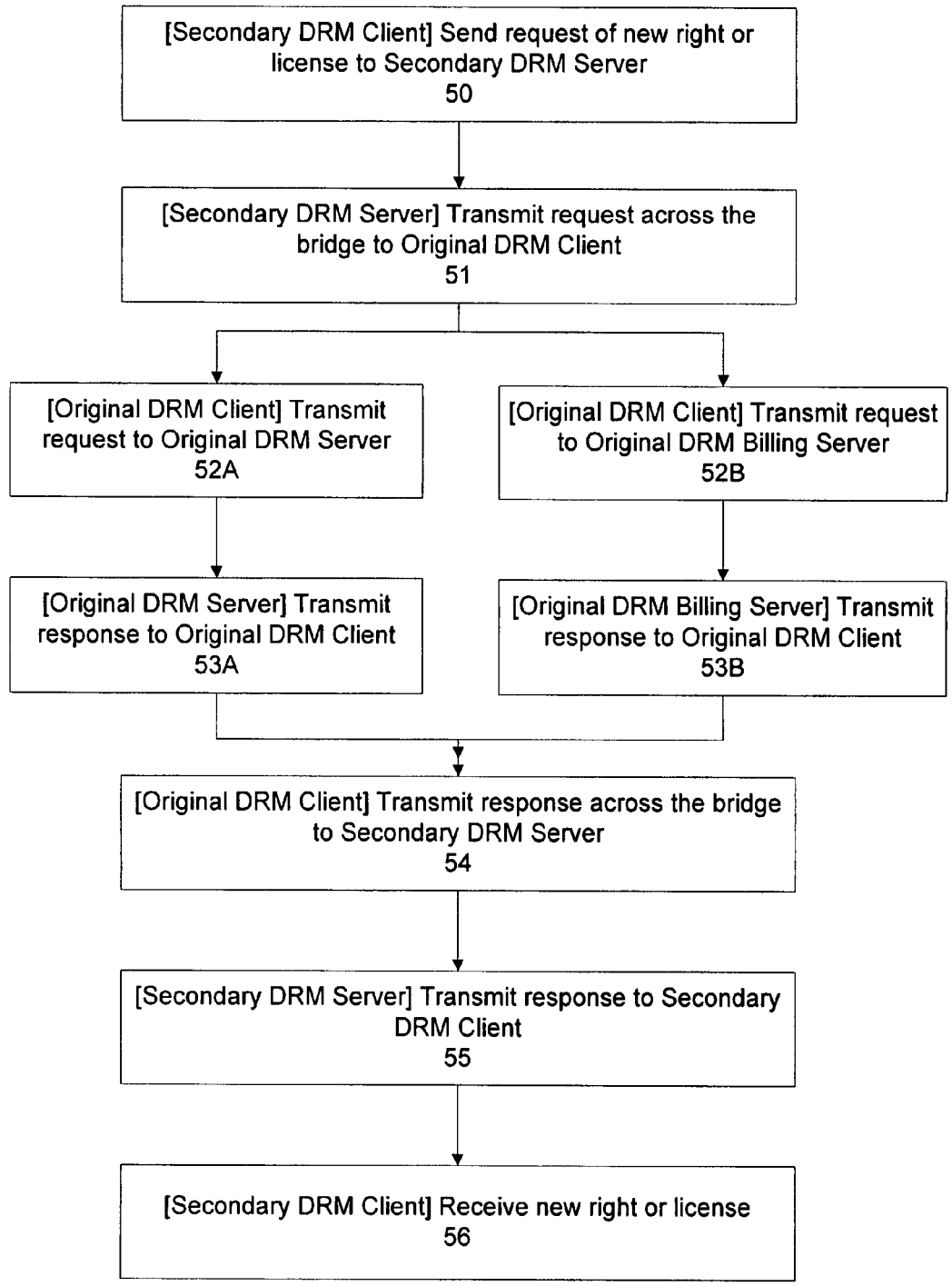
FIG. 10A is a flow chart illustrating an upgrade process according to an embodiment of the present invention. In particular, it shows an operation crossing the bridge for communication regarding upgrading of rights or license of digital media content.

With reference to FIG. 10A, the flow chart illustrates an exemplary process for upgrading digital media content according to an embodiment of the present invention. As before, this exemplary method is described in the context of protecting digital media using two digital rights management (DRM) systems, denoted as "Original" and "Secondary" in the flow chart. The exemplary process shown in the figure starts, at 50, by sending a request for new rights or license to a media content by the Secondary DRM Client. The request may include the original secondary DRM License with the License Renewal data that have been prepared by the bridge at the time of the license creation. The Secondary DRM server receives the request and transmits it, at 51, across the bridge to the Original DRM Client. The bridge can be reconstructed for the message to be sent through. In an embodiment, the Original DRM Client receives the request and transmits it to the Original DRM Server, in 52A, which then processes the request and transmits a response to the Original DRM Client, in 53A. The response may comprise the new rights or license, and an updated set of License Renewal data. In an alternative embodiment, the Original DRM Client transmits the request to the Original DRM Billing Server, in 52B, which then processes the request and transmits a response to the Original DRM Client, in 53B. The Original DRM Server is typically the server that sends the media content across the bridge to the Secondary DRM Client. The Original DRM Billing Server is a server for the Original DRM system which is not the server that sends the media content, but is special server designed to process billing requirements. The Original DRM Client then transmits the response across the bridge to the Secondary DRM Server, in 54, which then transmits the response to the Secondary DRM Client, in 55. Thus in response to the request, in 50, the Secondary DRM Client receives a response, corresponding to the request for new rights or license to the media content, in 56. In this exemplary process, the original DRM server or the original DRM billing server acts as the upgrade server, authenticating the request and transmitting the authorization (upgraded license or new rights) to the secondary DRM client.

Figure 10B:
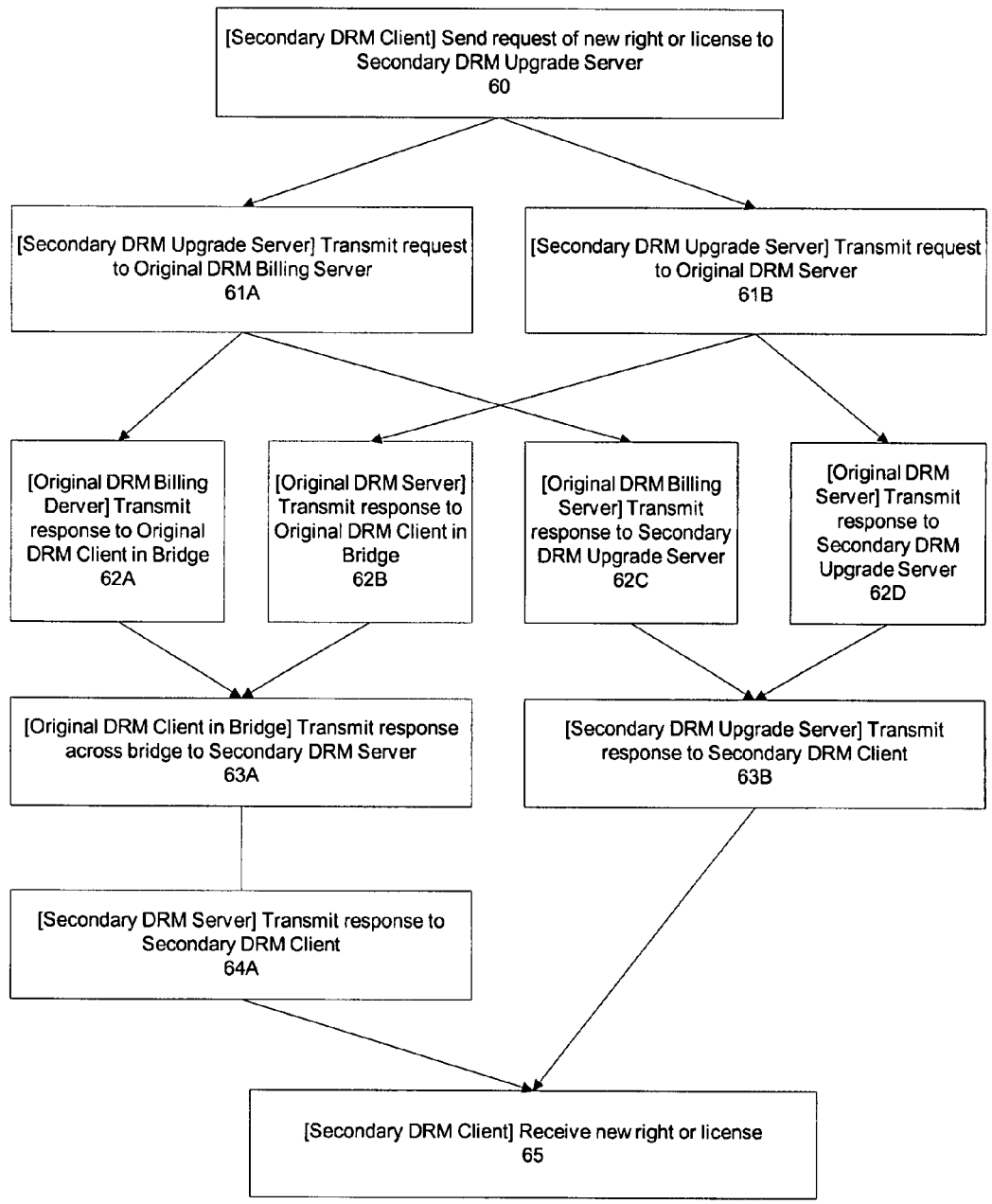
FIG. 10B is a flow chart illustrating an upgrade process according to an embodiment of the present invention. In particular, it shows an operation employing an Upgrade server, and without contacting the bridge server.

With reference to FIG. 10B, the flow chart illustrates another exemplary process for upgrading digital media content according to an embodiment of the present invention. The exemplary process shown in the figure starts, at 60, by sending a request for new rights or license to a media content by a Secondary DRM Client to a Secondary DRM Upgrade server. The Upgrade server is a separate server for the secondary DRM system, and is designed to handle upgrade request. By going through the upgrade server, the request does not have to route though the bridge. The Secondary DRM Upgrade server can transmits the request to the Original DRM Billing server, in 61A, or the Original DRM server, in 61B, and which then replies with a response to the Upgrade server, in 62C or 62D, respectively. The Upgrade server then transmits the response to the Secondary client, in 63B. Thus in response to the request, in 60, the Secondary DRM Client receives a response, corresponding to the request for new rights or license to the media content, in 65.

Alternatively, instead of tracing back the response with the path of the request, the Original DRM Billing Server or the Original DRM Server, from 61A or 61B, can reply to the Original DRM Client in the Bridge, in 62A or 62B, respectively. The Original DRM Client in Bridge then can transmit the response across the bridge to the Secondary DRM Server, in 63A, which then transmits the response to the Secondary DRM Client, in 64. Thus in response to the request, in 60, the Secondary DRM Client receives a response, corresponding to the request for new rights or license to the media content, in 65.

Figure 10C:
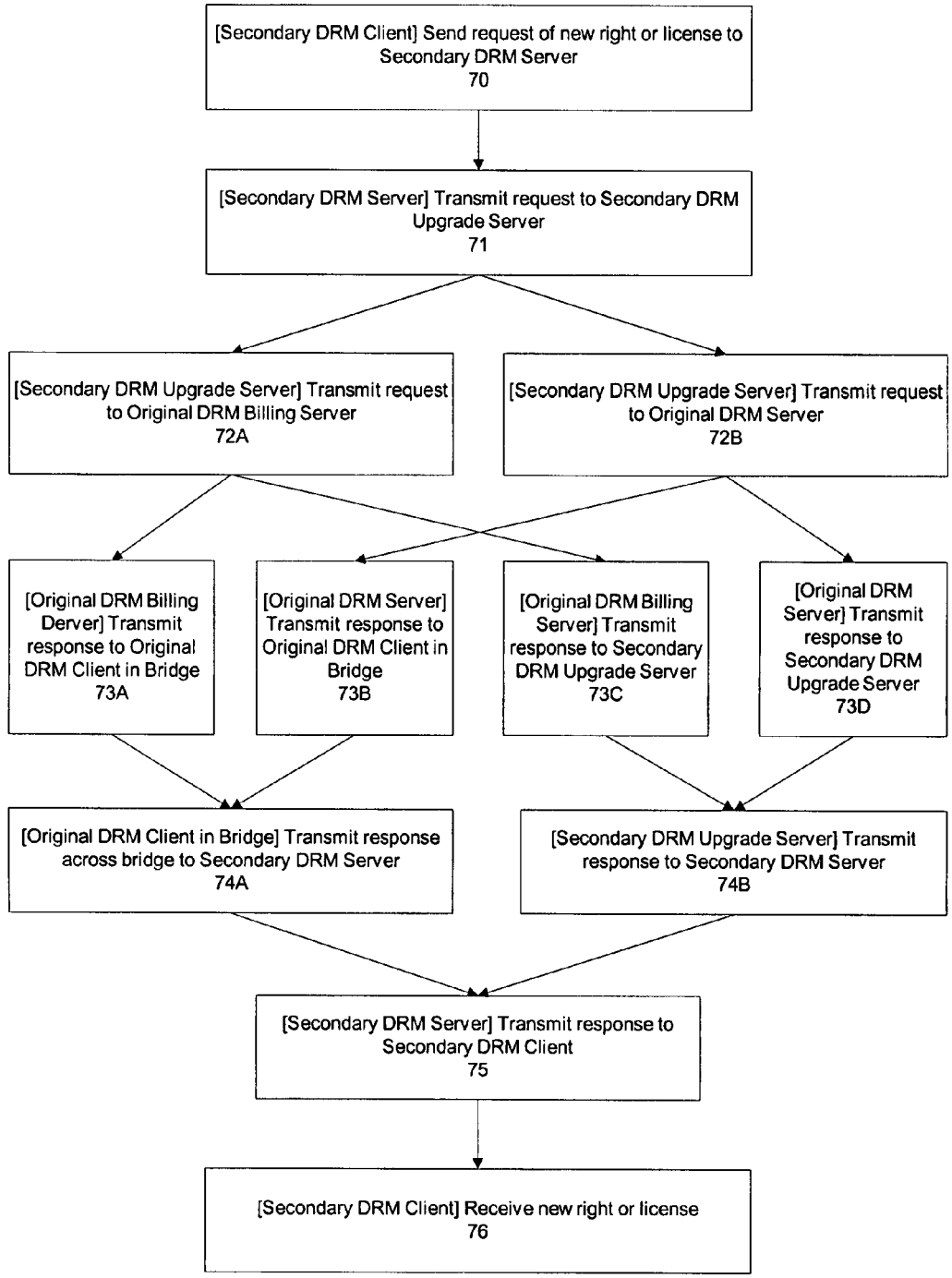
FIG. 10C is a flow chart illustrating an upgrade process according to an embodiment of the present invention. In particular, it shows an operation employing an Upgrade server, and an optional bridge server contact.

With reference to FIG. 10C, the flow chart illustrates another exemplary process for upgrading digital media content according to an embodiment of the present invention. The exemplary process shown in the figure starts, at 70, by sending a request for new rights or license to a media content by a Secondary DRM Client to the Secondary DRM server. The Secondary DRM server receives the request and transmits it to the Secondary DRM Upgrade server, in 71. The Secondary DRM Upgrade server can transmits the request to the Original DRM Billing server, in 72A, or the Original DRM server, in 72B, and which then replies with a response to the Upgrade server, in 73C or 73D, respectively. The Upgrade server then transmits the response to the Secondary DRM Server, in 74B. The Secondary DRM Server then transmits the response, in 75, to the Secondary DRM client. Thus in response to the request, in 70, the Secondary DRM Client receives a response, corresponding to the request for new rights or license to the media content, in 76.

Alternatively, instead of tracing back the response with the path of the request, the Original DRM Billing Server or the Original DRM Server, from 72A or 72B, can reply to the Original DRM Client in the Bridge, in 73A or 73B, respectively. The Original DRM Client in Bridge then can transmit the response across the bridge to the Secondary DRM Server, in 74A, which then transmits the response to the Secondary DRM Client, in 75. Thus in response to the request, in 70, the Secondary DRM Client receives a response, corresponding to the request for new rights or license to the media content, in 76.

Figure 11:
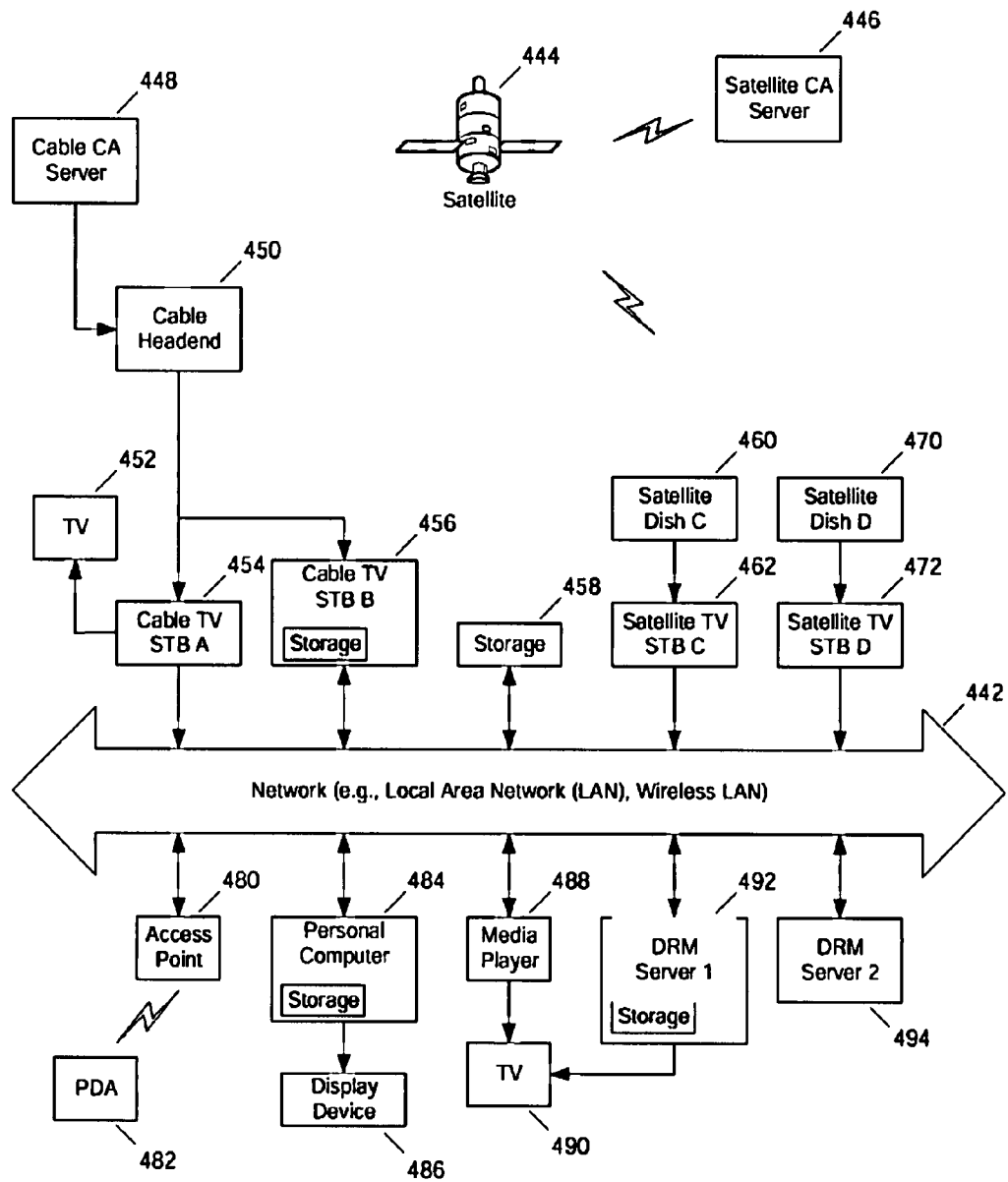
FIG. 11 shows an exemplary context where various embodiments of the present invention can be practiced.

With reference now to figures, FIG. 11 illustrates an exemplary context where certain embodiments of the present invention can be practiced. More specifically, the drawing illustrates a networked system with two security system sources, 444 and 450, with their own conditional access servers, 446 and 448, respectively, and two DRM systems, 492 and 494. The figure also includes various clients, 454, 458, 462, 472, 484, and 488. In one embodiment of the present invention, these various components are connected to a network 442, such as a local area network (LAN) or a wireless LAN. The network 442 may be partially a wired Ethernet in a home of a service subscriber with one or more wireless access points for mobile devices such as a personal digital assistant (PDA), a palm computer, a notebook computer, or a cellular phone (e.g., connected to the network through a WiFi or Bluetooth connection). For example, in FIG. 11, the PDA 482 connects to the access point 480 through the wireless connection and further to other components through the network 442. The network may also be a network for an organization or a commercial establishment (e.g., a hotel or a motel chain), such as an intranet or a virtual private network.

In FIG. 11, a digital rights management (DRM) server 494 is used with the cable TV service. The cable conditional access (CA) server 448 couples with the cable headend 450 to provide the CA protected media content through the cable television transmission system to the cable TV bridges (e.g., 454 and 456) which may include cable TV tuners. The cable TV set-top boxes (STB) receive the data packages and de-multiplex the entitlement management messages (EMM) and entitlement control messages (ECM) and the scrambled media content. Under the control and protection of the DRM server 494, the media content can be secured on a storage (e.g., 456, 458, 484) for access by various devices which can play back the media content, such as the personal computer 484, the media player 488, or the PDA 482. The personal computer 484 typically displays the video content on the display device 486, such as a cathode ray tube (CRT) monitor, a liquid crystal display (LCD) panel, or a plasma display panel. The media player 488 may present the media content on a television set 490. A media player may also be integrated with a television set to form a network-ready digital television set.

In one embodiment, the DRM server 494 provides services to descramble/decrypt the cable TV broadcast. The decrypted/descrambled information is further protected by the DRM system so that the media content from the broadcast of the cable TV system can be used in an authorized way. When authorized, the content can be recorded and played back at any time on any device convenient to the user in accordance with the rights of the subscriber. For example, with a subscription to only one simultaneous use, a user may choose to use cable TV set-top box 454 to receive the broadcast and view the program on the TV 452, or use cable TV set-top box 456 to record the program on the associated storage for playing back at a different time, for example, using PDA 482, personal computer 484, or media player 488. In some embodiments, the media content and/or associated keys are protected by encrypting the data with encryption keys associated with the DRM system 494.

In FIG. 11, another DRM system 492 is used in association with both the satellite TV set-top box C 462 and the satellite TV set-top box D 472. The DRM server 492 may store the protected media content on its storage or on other storage devices on the network, such as the storage on the personal computer 484 or the storage 458. Typically, a satellite 444 broadcasts the protected media content to a geographical area. Separate satellite dishes (e.g., 460 and 470) are used for different satellite set-top boxes (e.g., 462 and 472, respectively). Typically, to access two different channels simultaneously, two set-top boxes are used. Satellite set-top boxes are independent from each other. The satellite broadcasts to the two set-top boxes as if the set-top boxes were for two different subscribers. In certain embodiments of the present invention, one DRM server (e.g., 492) is used to manage digital rights associated with multiple set-top boxes (e.g., 462 and 472).

In an embodiment, one or more DRM servers are used to protect digital media which have been originally delivered by one or more servers, such as CA servers, which makes desirable to have bridges between the DRM systems to simplify content management, while enforcing digital rights management within both DRM systems. In one embodiment of the present invention, multiple DRM servers are physically in one data processing device with different software and smart cards for the processing of the messages of different CA systems. Further, a DRM server may be integrated with a bridge, a storage device (e.g., PDA 482, personal computer 484, media player 488), or combination of them. For example, the DRM system 492, which may be used in conjunction with a satellite TV CA server 446, may include a storage for recording media content, a interface between a satellite dish and a renderer for decoding the media content into standard video signals (for a television set and/or for a computer monitor).

Figure 12:
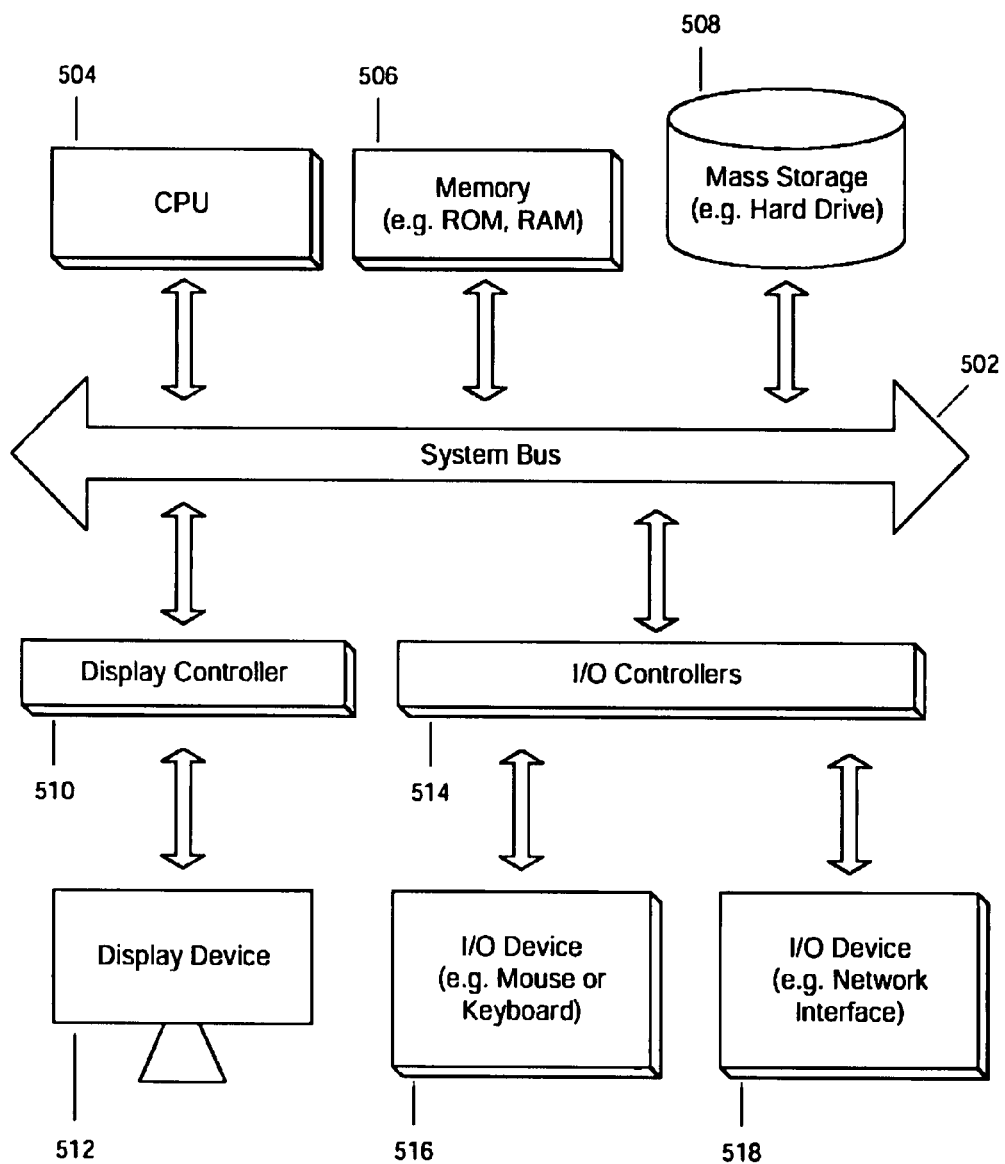
FIG. 12 illustrates a typical "architecture" of a data processing system which may be used in relation with various embodiments of the present invention. For example, the exemplary system shown in the figure may represent a bridge or a DRM server.

FIG. 12 illustrates a typical "architecture" of a data processing system, which may be used with various embodiments of the present invention. For example, the system shown in the figure may represent an exemplary bridge implementation according to an embodiment. Or, it may represent an exemplary DRM server. As will be appreciated by one of skill in the art, the present invention may be embodied as a method, data processing system or program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the medium. Any suitable storage medium may be utilized including hard disks, CD-ROMs, DVD-ROMs, optical storage devices, or magnetic storage devices. Thus the scope of the invention should be determined by the appended claims and their legal equivalents, and not by the examples given. Note that while FIG. 12 illustrates various components of a data processing system, it is not intended to represent any particular architecture or manner of interconnecting the components as such details are not germane to the present invention. It will also be appreciated that network computers and other data processing systems (such as cellular telephones, personal digital assistants, media players, etc.) which have fewer components or perhaps more components may also be used with the present invention.

As shown in FIG. 12, the computer system, which is a form of a data processing system, includes a bus 502 which is coupled to a microprocessor(s) 504 and a memory 506 such as a ROM (read only memory) and a volatile RAM and a non-volatile storage device(s) 508. The storage device may be used to store digital media content in certain embodiments. The system bus 502 interconnects these various components together and also interconnects these components 504, 506, and 508 to a display controller(s) 510 and display devices 512 and to peripheral devices such as input/output (I/O) devices 516 and 518 which may be mice, keyboards, modems, network interfaces, printers and other devices which are well known in the art. Typically, the I/O devices 516 and 518 are coupled to the system through one or more I/O controllers 514. The volatile RAM (random access memory) 506 is typically implemented as dynamic RAM (DRAM) which requires power continually in order to refresh or maintain the data in the memory. The mass storage 508 is typically a magnetic hard drive or a magnetic optical drive or an optical drive or a DVD ROM or other types of memory system which maintain data (e.g. large amounts of data) even after power is removed from the system. Typically, the mass storage 508 will also be a random access memory although this is not required. While FIG. 12 shows that the mass storage 508 is a local device coupled directly to the rest of the components in the data processing system, it will be appreciated that the present invention may utilize a non-volatile memory which is remote from the system, such as a network storage device which is coupled to the data processing system through a network interface 518 such as a modem or Ethernet interface. The bus 502 may include one or more buses connected to each other through various bridges, controllers and/or adapters as is well known in the art. In one embodiment, the I/O controller 514 includes a USB (universal serial bus) adapter for controlling USB peripherals and an IEEE 1394 (i.e., "firewire") controller for IEEE 1394 compliant peripherals. The display controllers 510 may include additional processors such as GPUs (graphical processing units) and they may control one or more display devices 512. The display controller 510 may have its own on-board memory.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM or RAM 506, mass storage, 508 or a remote storage device. In various embodiments, hardwired circuitry may be used in combination with software instructions to implement the present invention. Thus, the techniques are not limited to any specific combination of hardware circuitry and software or to any particular source for the instructions executed by the data processing system. In addition, throughout this disclosure, various functions and operations may be described as being performed by or caused by software codes to simplify the description. However, those skilled in the art will recognize what is meant by such expressions is that the functions result from execution of the code by a processor, such as the CPU unit 504.

Figure 13A:
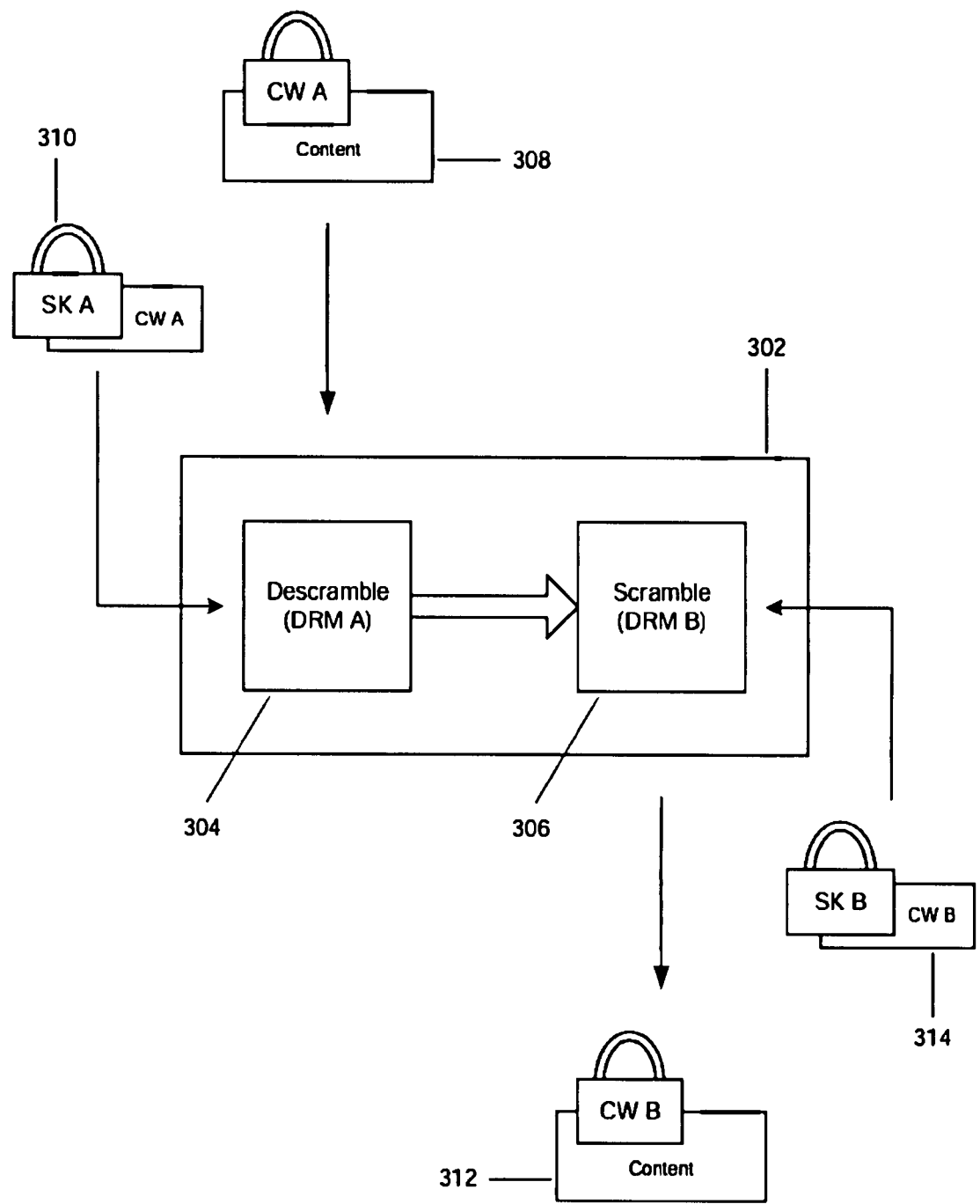
FIG. 13A shows an encryption scheme known as transcrambling, which transforms the input content scrambled with one key into the content scrambled a different key. The transformation occurs entirely within a hardware schematically denoted as a rectangular box in the figure.

There are various bridging schemes between the DRM systems according to the present invention. FIG. 13A shows a bridge known as transcrambling. Transcrambling is a hardware-based method for changing digital media protection between two different DRM systems. The transformation occurs entirely within a generally secure hardware device (e.g., in a single integrated circuit chip), which is schematically denoted as a rectangular box 302 in the figure. The digital media content 308 is initially scrambled with a control word 310 ("CW A"), which is also encrypted with a service key ("SK A"). Both the content and the control word are under the protection of the first DRM system (not explicitly shown in the figure). Once the content 308 is input into the transcrambler chip 302, it is first descrambled, at 304, using the (decrypted) control words 310, and it is rescrambled, at 306, using the (decrypted) control word 314 ("CW B") of the second DRM system (not explicitly shown). Note that the control word 314 is under the protection of the second DRM system, as indicated in the figure by the fact that it is encrypted with a service key ("SK B") from the second DRM system. The rescrambled content 312 is then transmitted out of the transformation unit 302 for further processing or storage. Since the DRM bridging occurs within a single chip, this method is considered relatively secure. In some designs, the chip is made "opaque", and it is protected against reverse engineering using various means. However, this scheme is rather expensive since it requires manufacturing of integrated chips with specific dedicated functions. It also lacks flexibility since the hardware design is not easy to change.

Figure 13B:
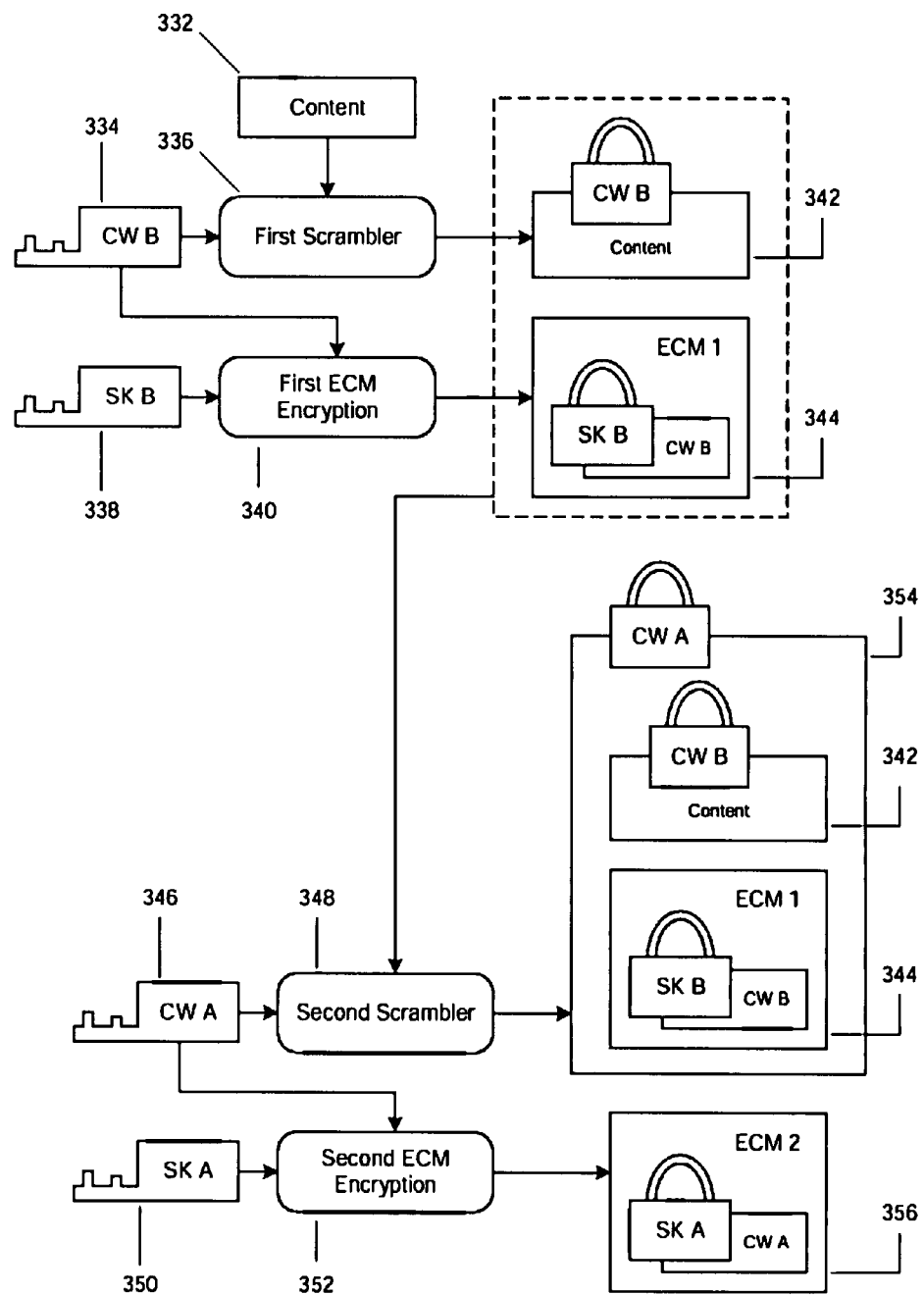
FIG. 13B shows an encryption scheme known as superscrambling. The digital media content is doubly scrambled with two control words from two DRM systems. The doubly scrambled message also includes an encrypted control word.

FIG. 13B shows a bridge known as superscrambling. Superscrambling refers to a technique of recursively, or repeatedly, scrambling digital media content with control words of multiple DRM systems. The figure illustrates an exemplary superscrambling process with two control words, each of which is from a different DRM and/or CA system. More specifically, the figure illustrates a process of superscrambling a media content 332 with two control words, 334 and 346. Control word 334 and service key 338 (e.g., "local" keys) are associated with one DRM system (e.g., an "inner" or "local" system), whereas control word 346 and service key 350 (e.g., "global" keys) are associated with another DRM system (e.g., an "outer" or "global" system). The digital media content 332 is first encrypted, or scrambled, with the first control word 334, at 336, and a scrambled content 342 is produced. Likewise, control word 334 is encrypted with service key 338, at 340, and an ECM 344 is created. This pair of encrypted data is then encrypted again with the second control word 346, at 348. This generates a doubly scrambled (or, "superscrambled") content 354, which is schematically shown in the figure to include the first scrambled media content 342 and the first ECM 344. The second control word 346 is also encrypted with the second service key 350, at 352, and a new ECM 356 is created. Then, this pair of encrypted data, 354 and 356, is delivered to clients, for example, through a distribution path similar to the one shown in FIG. 4B. Since the digital media content is doubly scrambled in this example, the content is never exposed in clear form during the transmission (e.g., while passing between the first and the second DRM systems). In particular, when the outer encryption layer (e.g., represented by the control word 346 in the scrambled content 354 of FIG. 13B) is removed, the content is still protected by the first DRM system, indicated by the fact that the content 342 is encrypted with the control word 334. It should, however, be noted that this prior art approach requires both DRM systems present both at the source (e.g., a server) and at the sink (e.g., a client device). This approach may not be feasible in many practical applications, especially when "global" keys may not be available on the second (e.g., "inner") DRM system.

Figure 13C:
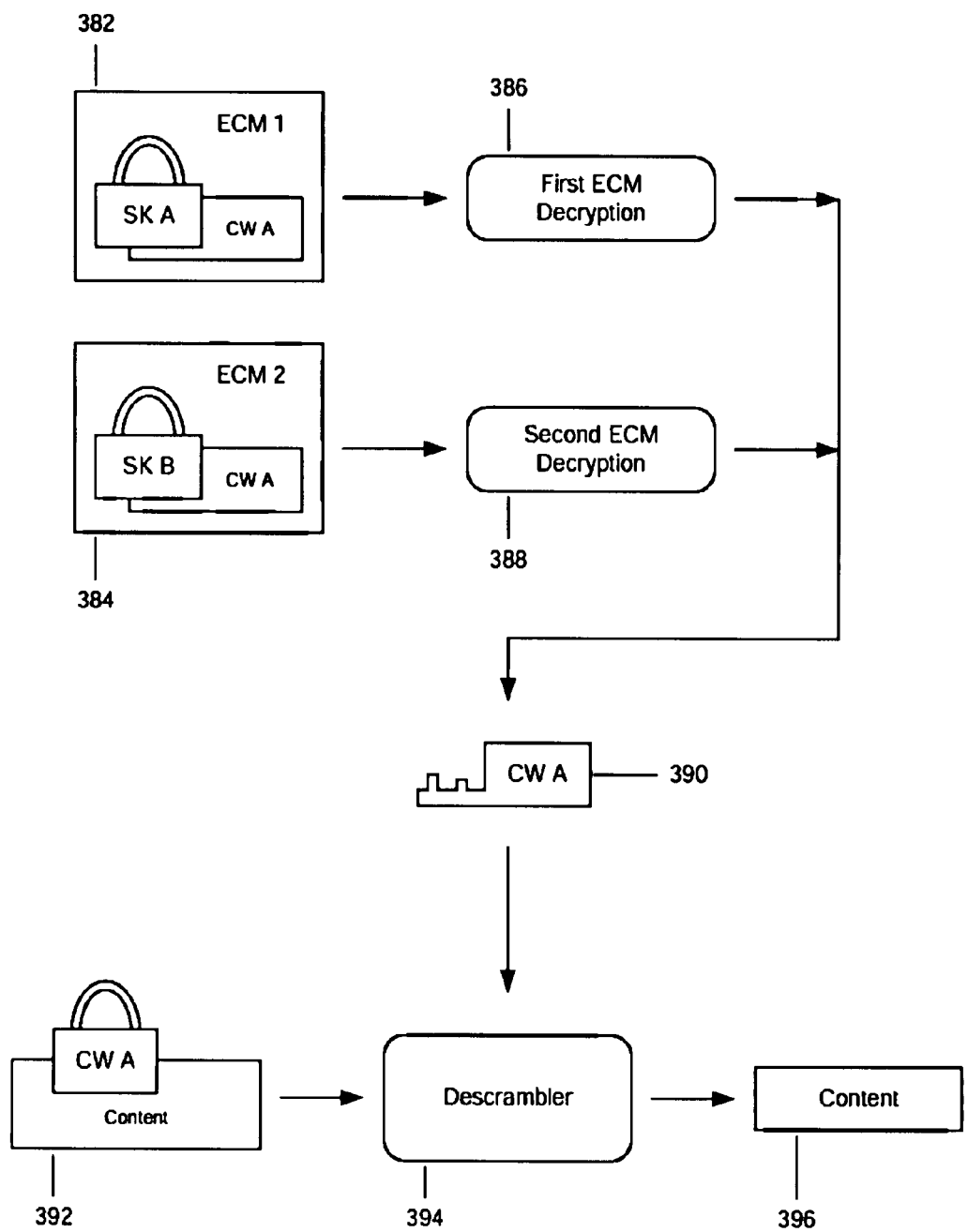
FIG. 13C shows an encryption scheme known as simulcrypt. The figure shows two entitlement control messages (ECM). The control word, "CW A", necessary to decrypt the scrambled digital media content can be obtained from either "ECM 1" or "ECM 2".

Another bridge called simulcrypt is illustrated next with respect to FIG. 13C. Simulcrypt is a method for encrypting data in multiple ways, e.g., using multiple keys, so that it can be decrypted with any of the corresponding decryption keys. In the example shown in the figure, which is described in the context of cable television content delivery, the digital media content 396 is scrambled with a control word 390, which is encrypted in two alternative methods. That is, the control word 390 is encrypted with two different service keys, as shown in the figure as two different ECMs, 382 and 384. Therefore, the decryption key 390 can be obtained from either ECM 382 or ECM 384, and a client who has access to either of the ECMs, 382 or 384, can recover the control word 390, either by decrypting, at 386, the ECM 382 or by decrypting, at 388, the ECM 384. As illustrated in the figure, once the control word 390 is recovered, the encrypted content 392 can be descrambled, at 394, to obtain the clear content 396.

Figure 13D:
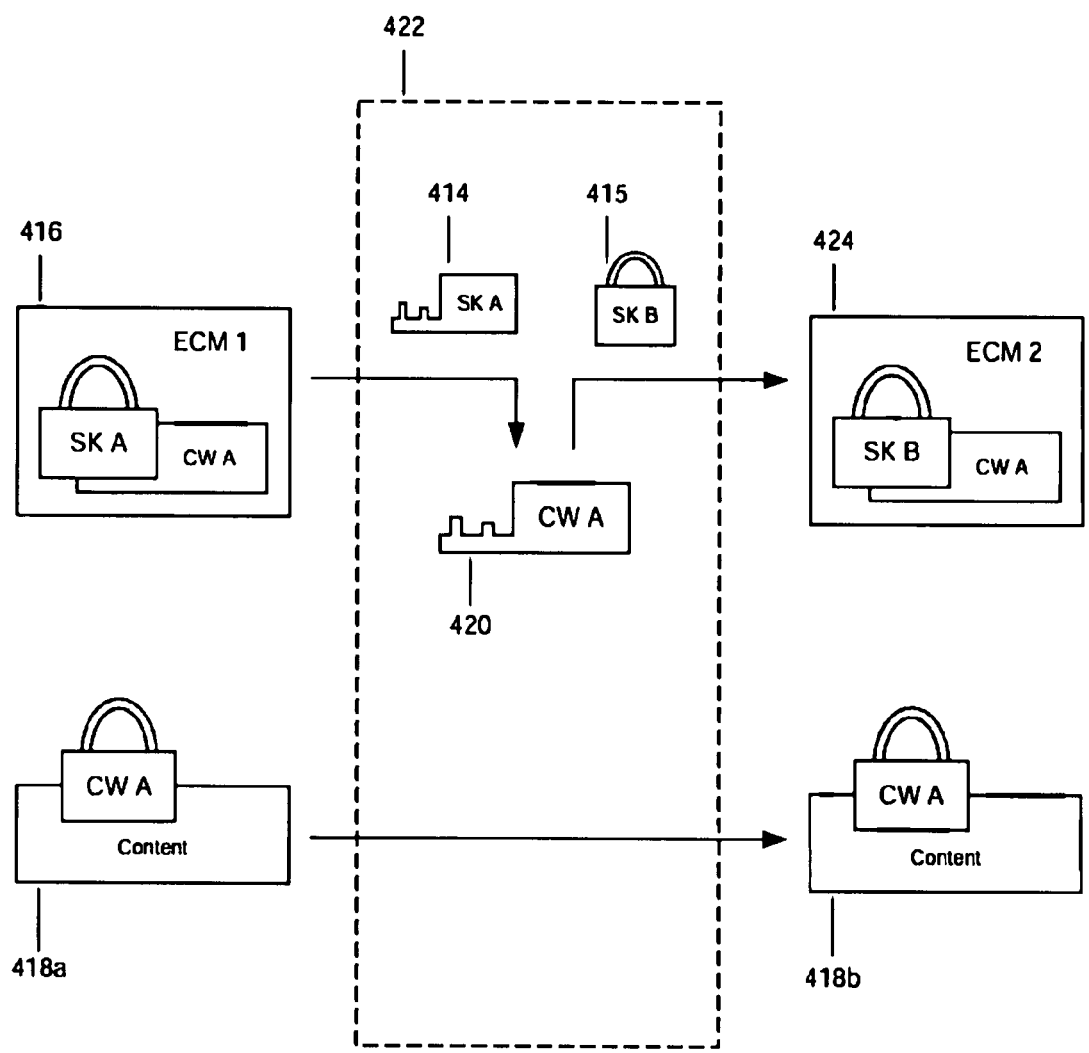
FIG. 13D shows a method of bridging, known as a key rotation, which is based on the assumption that two DRM systems use the same content scrambling algorithm (common scrambling).

FIG. 13D shows how a bridge known as common scrambling can simplify the 'bridging' process when relevant CA or DRM systems share the same content scrambling/encryption algorithm. In the example illustrated in the figure, two DRM systems (represented by 'A' and 'B') are employed at the bridge 422 to manage the digital rights associated with a digital media. Both DRM systems use the same scrambling algorithm, and in particular the same control word 420. The control word 420 can be recovered from an ECM 416 with proper permission (e.g., service key 414 of the first DRM system). At the bridge 422, the content 418a is not descrambled with the control word 420 but it is output as it is, i.e., as the same scrambled content 418b shown at the right-hand side of the figure. However, the control word 420 ("CW A") is decrypted and then encrypted again using a different service key 415 from the second DRM server (ECM 424). The content is, therefore, not exposed in clear form in the bridge. It should be noted that this particular prior art method is only concerned with bridging of the keys but not contents and, as stated earlier, this bridging method can be used only when the two DRM systems use the same scrambling algorithms as in the case of common scrambling.

Figure 14A:
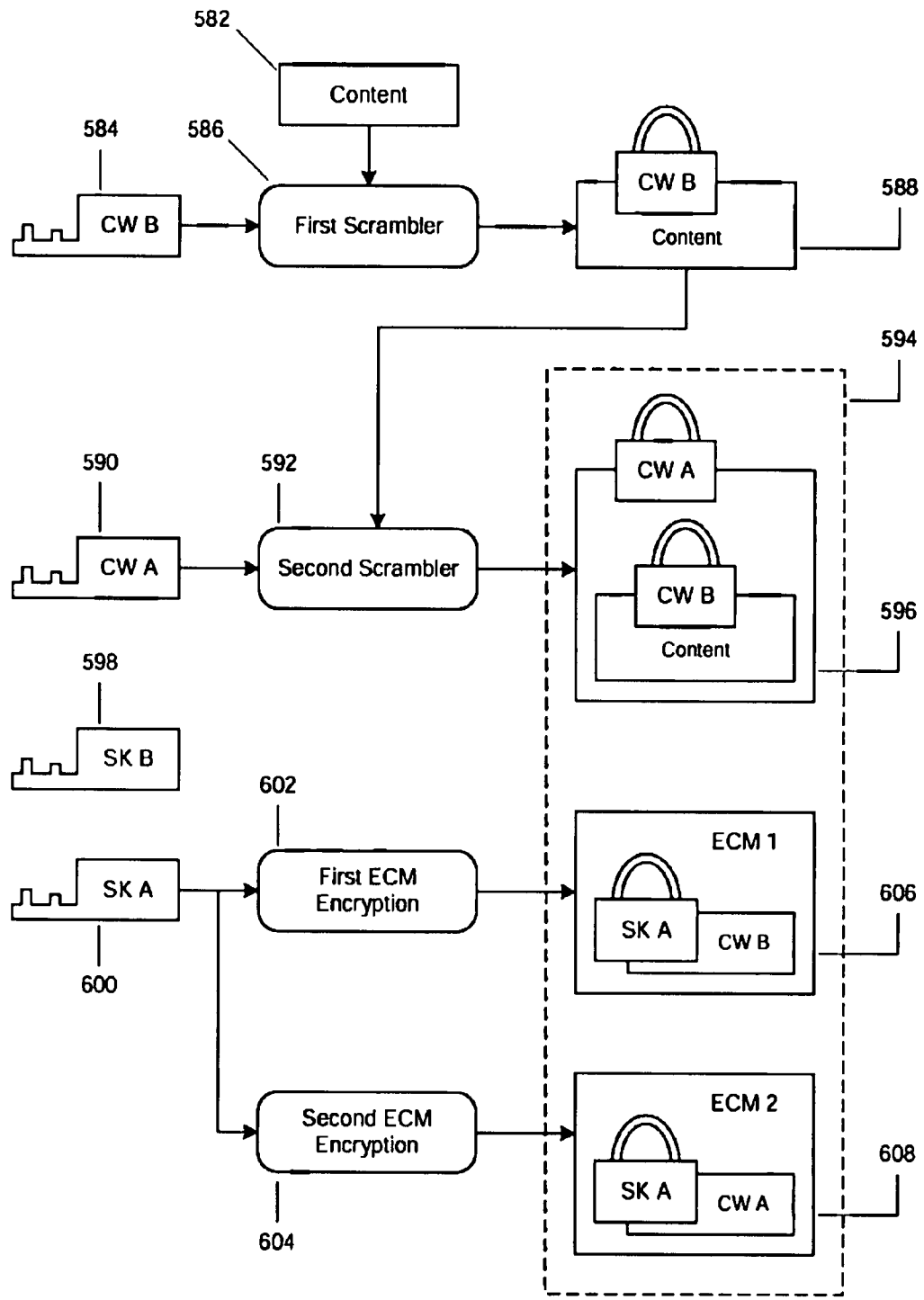
FIG. 14A shows an exemplary process in certain embodiments of the present invention. In particular, the figure illustrates an encryption or scrambling process according to an embodiment. As shown in the figure, the content is doubly scrambled (or, overscrambled) with two control words, "CW A" and "CW B".
Figure 14B:
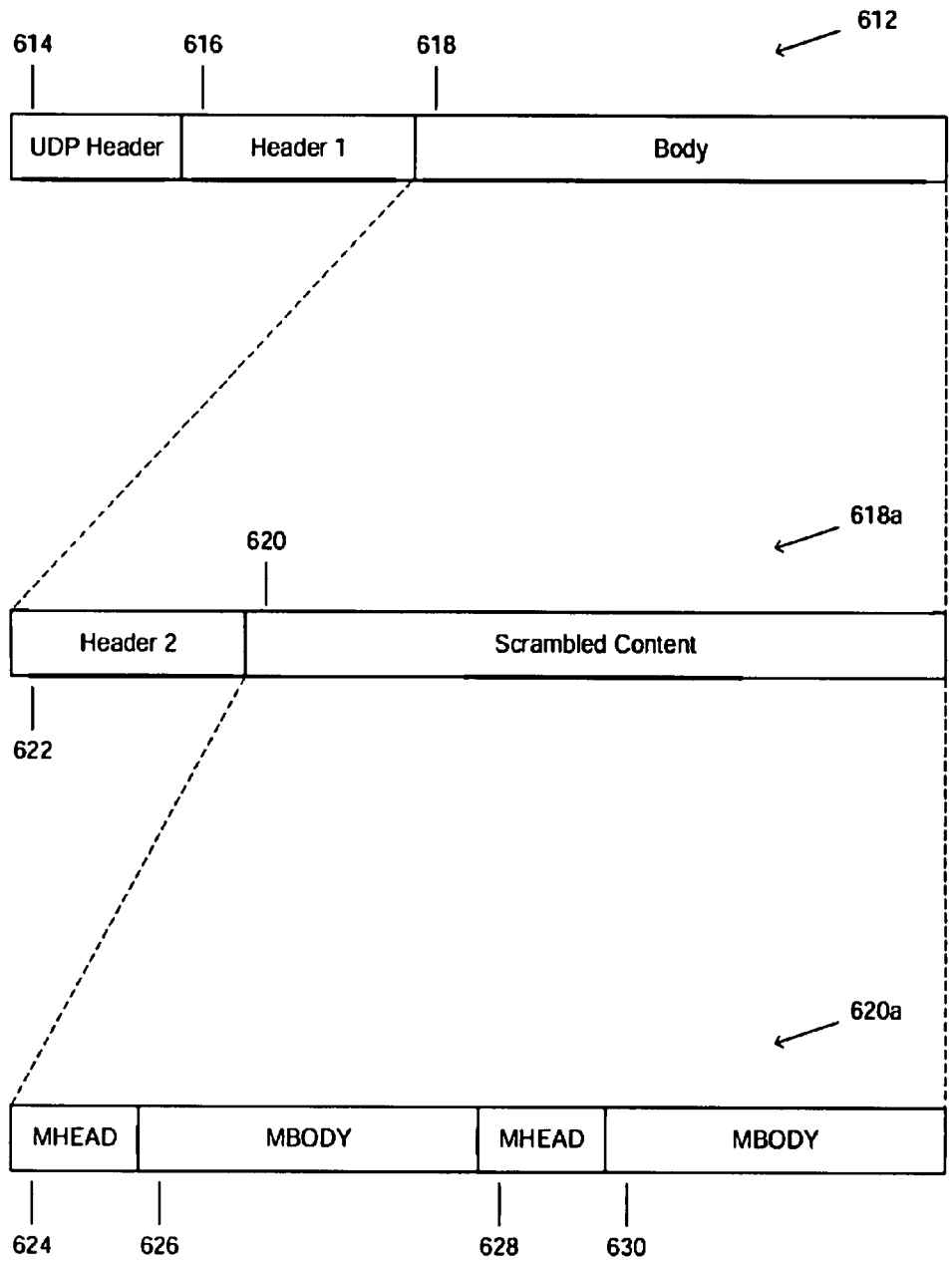
FIG. 14B shows a schematic representation of a DTCP (Digital Transmission Content Protection) data packet when used over IP according to an embodiment of the present invention. The DTCP packet encodes scrambled digital media content and other pertinent security keys.
Figure 14C:
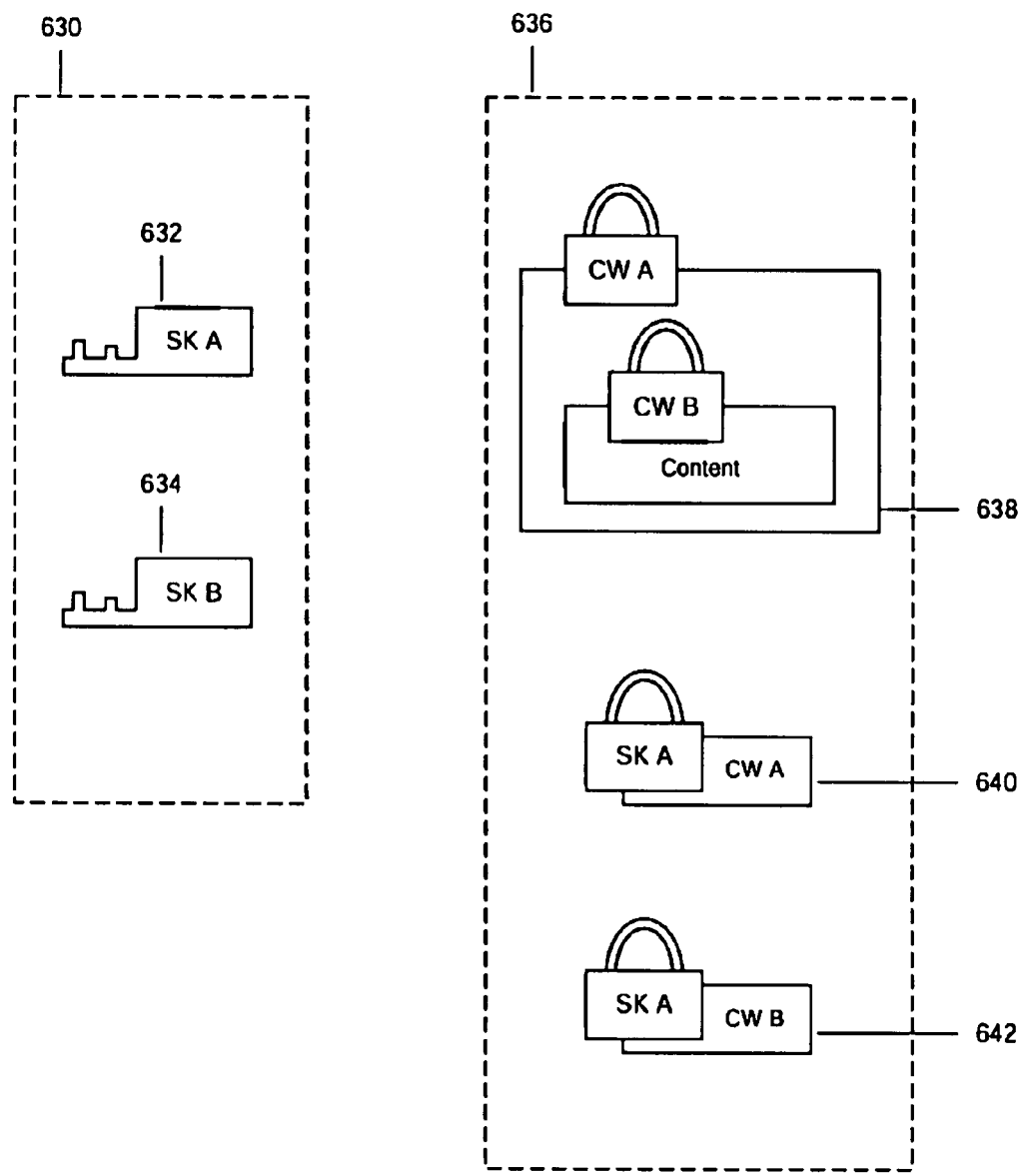
FIG. 14C shows a list of encrypted messages and encryption/decryption keys in certain embodiments of the present invention. In particular, the content has been overscrambled as illustrated in FIG. 13A.

Referring now to FIGS. 14A-14C, various aspects of certain embodiments of an overscrambling bridge are illustrated. FIG. 14A illustrates an encryption or scrambling process according to an embodiment. This exemplary process pertains to encrypting digital media content 582 and two control words, 584 and 590, each of which may be associated with a different digital rights management (DRM) system. First, digital media content 582 is scrambled, at 586, with a control word 584 ("CW B") associated with a target (or, "outer" or "local") DRM system, and a scrambled media content 588 is created, which is illustrated as a "locked" content with a lock labeled "CW B" in the figure. Then, the scrambled content 588 is scrambled again, at 592, with another control word 590 ("CW A"), which creates doubly scrambled, or "overscrambled", digital media content 596. It should be noted that, in certain embodiments, the content 582 might represent a segment of a "program" which lasts, for example, 0.1 second, during which the control words 584 and 590 are in effect. In certain other embodiments, the content 582 may correspond to a whole program such as a movie title. Next, control words are in turn encrypted with service keys associated with the DRM systems. In one embodiment, each control word (e.g., 584 and 590) is encrypted with its corresponding service key (e.g., 598 and 600, respectively). In the embodiment shown in FIG. 14A, both control words 584 and 590 are encrypted with the same service key, i.e., service key 600 managed by the DRM system associated with control word 590 in this example ("global" or "outer" DRM). As illustrated in the figure, control word 584 is encrypted, at 602, with service key 600 ("SK A") and the first encrypted message (e.g., entitlement control message, or ECM) 606 is created. Control word 590 is then encrypted, at 604, again with the same service key 600 and the second encrypted message 608 is created. This set of encrypted messages, shown in the broken-line box 594 in the drawing, which comprises the overscrambled content 596 and the encrypted control words 606 and 608, is delivered to a bridge or a client, possibly with other messages which include, for example, entitlement (e.g., service keys 598 and 600) for the particular client(s) and/or for the delivered digital media. In some embodiments, the entitlement messages are delivered to the bridge in response to a client's request. In some cases, the encrypted control words are also delivered "on-demand" when an explicit request is made from the client, for example, at the time of storage or playback of the digital media.

In some embodiments, a bridged DRM server delivers digital media through IP network using DTCP (Digital Transmission Content Protection) packets. DTCP is a standard for protecting digital rights during the transmission of digital media. The bridged DRM server creates DTCP packets with payload including digital media content and various keys, which may be encrypted or scrambled. This is illustrated in FIG. 14B. The figure shows a schematic representation of a DTCP data packet 612. The data packet encodes scrambled/overscrambled digital media content 618 according to an embodiment of the present invention. The packet 612 includes a UDP (User Datagram Protocol) header 614 in this example. The packet also includes a portion, or a header, 616 which is associated with a payload or a body 618 including the scrambled content 620. The payload 618a may contain another header 622. As in the example shown in FIG. 14A, the content 620 may have been doubly encrypted and the headers 616 and 622 may carry the information regarding the "outer" and "inner" layer scrambling, respectively (e.g., scrambling with the control words 590 and 584 of FIG. 14A). In some embodiments, the header 616 comprises an ECM (e.g., the encrypted control word 608 of FIG. 14A) and/or an EMM. Likewise, the header 622 may contain relevant ECMs and/or EMMs. According to an embodiment of the present invention, each block of the content 620 of FIG. 14B is scrambled with a block cipher such as AES (Advanced Encryption Standard) or DES (Data Encryption Standard) or 3DES (Triple DES). Other common encryption algorithms include M2 (multi 2) and M6 (multi 6), and DVB-CSA as mentioned earlier. Multiple blocks, or the whole content, may be encrypted according to AES and CBC (Cipher Block Chaining) or AES and ECB (Electronic Codebook). FIG. 14B also illustrates the scrambled content in further detail, as shown at the bottom of the drawing as 620a. The content may have been scrambled (not explicitly indicated in the figure) with another control word (e.g., 584 of FIG. 14A), and header 622 may include the associated ECM (e.g., 606 of FIG. 14A) in some embodiments, as stated earlier. The content is typically encoded with MPEG-2 formats. FIG. 14B shows multiple MPEG headers, 624 and 628, and bodies, 626 and 630. In certain embodiments, the inner layer is scrambled with a different encryption scheme, such as AES in conjunction with CTR (a block cipher mode of operation known as Counter) or 3DES+CBC, from that used for the outer layer.

In some embodiments of the present invention, different DRM systems may utilize different scrambling schemes. For example, the first scrambling 586 and the second scrambling 592 of FIG. 14A use different scrambling schemes in certain embodiments. Or, the scrambled content 620 (scrambling not explicitly shown) in FIG. 14B are encrypted or overscrambled by different scrambling schemes in certain embodiments of the present invention. In this description, a scrambling scheme refers to various features, as a whole, of an encryption method. For example, a scrambling scheme comprises an encryption algorithm (AES vs. 3DES, etc.) and a mode of operation in block cipher (CBC vs. CTR vs. ECB, etc.). In some cases, content formatting/encoding (e.g., MPEG transport stream, etc.) is also considered a part of a scrambling scheme. The "inner data packet" 620a shown in FIG. 14B, for example, uses a scrambling scheme comprising an MPEG encoding, as symbolically indicated in the figure by MPEG headers 624 and 628 and MPEG bodies 626 and 630.

Turning now to FIG. 14C, a list of pertinent messages is shown according to an embodiment of the present invention. The list 636 includes doubly scrambled digital media content 638 encrypted with two control words, an "outer" or "global" control word 640 encrypted with a service key 632, and an "inner" or "local" control word 642 encrypted with the same service key 632. This set of encrypted messages and relevant service keys 630 are utilized in certain embodiments for bridging different digital rights management (DRM) systems (e.g., between a "global" and "local" ones). The list 636 is an outcome of the overscrambling (e.g., as shown in FIG. 14A), and it can be used as an input to the bridge. The bridge and/or client typically need authorization from the relevant DRM servers, for example, as a form of service keys. FIG. 14C shows another service key 634 associated with an "inner" or "local" DRM system.

Thus, systems, methods, and apparatuses for managing digital rights in digital media delivery have been provided. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method for repurposing a media originated from an original digital rights management system and passed through a bridge to be under the protection of a secondary digital rights management system, the method comprising:

receiving a license upgrade request, by a server of the secondary digital rights management system, with license renewal data, wherein the license renewal data have been previously created and secured, through encryption and authentication by the original digital rights management system and have been previously added to the media by the bridge at the time the media was first issued to the secondary digital rights management system;

sending, by the server of the secondary digital rights management system, a request for an authorization to upgrade the secondary digital rights management license to the original digital rights management system, the request including the license renewal data;

receiving, by the server of the secondary digital rights management system, the authorization, wherein the authorization is provided from the original digital rights management system based on the license renewal data; and upgrading, by the server of the secondary digital rights management system, the secondary digital rights management license based on the authorization to provide upgraded rights to access the media from the secondary digital rights management system.

2. A method as in claim 1 wherein the bridge includes a client of the original digital rights management (DRM) system and the server of the secondary DRM system.

3. A method as in claim 1 wherein the authorization from the original digital rights management system is provided by a billing system that is configured to authorize the upgrading of the media access to the secondary digital rights management system.

4. A method as in claim 1 wherein upgrading the secondary digital rights management license comprises at least one of extending a lifetime of the license, enabling new rights, enabling new exports, enabling move operation or restoration operation to another machine, or any combination thereof.

5. A method as in claim 1 wherein some of the license renewal data include at least one of data identifying a preferred secondary DRM update server, subscriber identification data, device identification data, media identification data, targeted DRM client data, schedule data, and data for a DRM update server to retrieve a key for the media.

6. A method as in claim 1, wherein the license renewal data are not decryptable by the secondary digital rights management system.

7. A method for a client of a secondary digital rights management system to get an upgraded access to a media originated from an original digital rights management system, the media stored within the access of the client of the secondary digital rights management system, the media sent through a bridge from the original digital rights management system to the secondary digital rights management system, and wherein license renewal data have been previously added to the media by the bridge at the time the media was first issued to the secondary digital rights management system, the method comprising:

sending, by the client of the secondary digital rights management system, a request with the license renewal data to a server of the secondary digital rights management system to get an upgraded license or rights;

receiving, by the client of the secondary digital rights management system, the upgraded license or rights to access the media, wherein the upgraded license or rights is created by the server of the secondary digital rights management system based on an authorization sent from the original digital rights management system, wherein the authorization is provided by the original digital rights management system based on the license renewal data sent by the client of the secondary digital rights management system, wherein the license renewal data have been previously created and secured, through encryption and authentication by the original digital rights management system and have been previously added to the media by the bridge at the time the media was first issued to the secondary digital rights management system, wherein the upgraded license or rights is configured to provide upgraded rights to access the media by the secondary digital rights management system.

8. A method as in claim 7 wherein the server of the secondary digital rights management system comprises an upgrade server of the secondary digital rights management system,
and wherein the upgrade server of the secondary digital rights management system sends a request for the authorization to the original digital rights management system to get the upgrade license or rights.

9. A method as in claim 8 wherein the upgrade server of the secondary digital rights management system comprises a server in the bridge, or a separate independent server.

10. A method as in claim 8 wherein the original digital rights management system for the communication comprises at least one of a server sending the media, and a separate billing or upgrade server of the original digital rights management system.

11. A method as in claim 8 wherein the client sends the request to the bridge, or to an independent server of the secondary digital rights management system before reaching the original digital rights management system.

12. A method as in claim 7 wherein the authorization is sent from the original digital rights management (DRM) system to the secondary digital rights management system and wherein the bridge includes a client of the original DRM system and the server of the secondary DRM system.

13. A method as in claim 7 wherein the authorization from the original digital rights management system is provided by a billing system that is configured to authorize the upgrading the access to the media to the secondary digital rights management system.

14. A method as in claim 7 wherein the upgraded license or rights is configured to provide at least one of extending the lifetime of the license, enabling new rights, enabling new exports, enabling move operation or restoration operation to another machine, or any combination thereof.

15. A method as in claim 14 wherein enabling new rights comprises allowing additional copy.

16. A method as in claim 14 wherein enabling new exports comprises additional bridging.

17. A method as in claim 7 wherein some of the license renewal data include at least one of data identifying a preferred secondary DRM update server, subscriber identification data, device identification data, media identification data, targeted DRM client data, schedule data, and data for a DRM update server to retrieve a key for the media.

18. A method as in claim 17 wherein some of the license renewal data are extracted and used to create the upgraded license.

19. A method as in claim 17 wherein some of the license renewal data are used to log or authorize the upgrade access transaction.

20. A method for a client of a secondary digital rights management system to get an upgraded access to a media originated from an original digital rights management system, the media stored within the access of the client of the secondary digital rights management system, the media sent through a bridge from the original digital rights management system to the secondary digital rights management system and being translated to include an additional information to allow the upgraded operation to be reconciled with the original digital rights management system and so that the secondary digital rights management system can modify the access, the method comprising:

sending, by the client of the secondary digital rights management system, a request with the additional information to an upgrade server of the secondary digital rights management system to get new rights to the media, wherein the upgrade server is configured to extract the additional information, wherein the additional information has been previously created and secured, through encryption and authentication by the original digital rights management system and has been previously added to the media by the bridge at the time the media was first issued to the secondary digital rights management system;

receiving, by the client of the secondary digital rights management system, the new rights to access the media wherein the new rights are provided by the upgrade server of the secondary digital rights management system based on an authorization sent from the original digital rights management system, wherein the authorization is provided by the original digital rights management system based on the additional information sent by the client of the secondary digital rights management system.

21. A method as in claim 20 wherein the bridge includes a client of the original digital rights management (DRM) system and a server of the secondary DRM system.

22. A method as in claim 21 wherein the additional information from the original digital rights management system comprises additional license renewal data.

23. A method as in claim 22 wherein the additional license renewal data are cryptographically linked to the license.

24. A method as in claim 22 wherein the additional license renewal data are also secured by the secondary digital rights management system.

25. A method as in claim 22 wherein the additional license renewal data comprise subscriber identification data, event identification data, time stamp, device identification data, renewal traceability data, restore data, encrypted content key, or any combination thereof.

26. An apparatus repurposing a media, the media originated from an original digital rights management system and passed through a bridge to be under the protection of a secondary digital rights management system, the apparatus comprising:
a processor;
a memory coupled with said processor, said memory having contained therein sequences of instructions which, when executed by said processor, cause said processor to perform operations comprising:
receiving a license upgrade request, by a server of the secondary digital rights management system, with license renewal data, wherein the license renewal data have been previously created and secured, through encryption and authentication by the original digital rights management system and have been previously added to the media by the bridge at the time the media was first issued to the secondary digital rights management system,
sending, by the server of the secondary digital rights management system, a request for an authorization to upgrade the secondary digital rights management license to the original digital rights management system, the request including the license renewal data;
receiving, by the server of the secondary digital rights management system, the authorization, wherein the authorization is provided from the original digital rights management system based on the license renewal data; and upgrading, by the server of the secondary digital rights management, the secondary digital rights management license based on the authorization to provide upgraded rights to access the media from the secondary digital rights management system.

27. An apparatus as in claim 26 wherein the bridge includes a client of the original DRM system and the server of the secondary DRM system.

28. An apparatus as in claim 26 wherein the authorization from the original digital rights management system is provided by a billing system that is configured to authorize the upgrading the media access to the secondary digital rights management system.

29. An apparatus as in claim 26 wherein upgrading the secondary digital rights management license comprises at least one of extending a lifetime of the license, enabling new rights, enabling new exports, enabling move operation or restoration operation to another machine, or any combination thereof.

30. An apparatus as in claim 26 wherein some of the license renewal data include at least one of data identifying a preferred secondary DRM update server, subscriber identification data, device identification data, media identification data, targeted DRM client data, schedule data, and data for a DRM update server to retrieve a key for the media.

31. An apparatus for a client of a secondary digital rights management system to get an upgraded access to a media originated from an original digital rights management system, the media stored within the access of the client of the secondary digital rights management system, the media sent through a bridge from the original digital rights management system to the secondary digital rights management system, and wherein license renewal data have been previously added to the media by the bridge at the time the media was first issued to the secondary digital rights management system, the apparatus comprising:
  a processor;
  a memory coupled with said processor, said memory having contained therein sequences of instructions which, when executed by said processor, cause said processor to perform operations comprising
    sending, by the client of the secondary digital rights management system, a request with the license renewal data to a server of the secondary digital rights management system to get an upgraded license or rights;
    receiving, by the client of the secondary digital rights management system, the upgraded license or rights to access the media wherein the upgraded license or rights is created by the server of the secondary digital rights management system based on an authorization sent from the original digital rights management system, wherein the authorization is provided by the original digital rights management system based on the license renewal data sent by the client of the secondary digital rights management system, wherein the license renewal data have been previously created and secured, through encryption and authentication by the original digital rights management system and have been previously added to the media by the bridge at the time the media was first issued to the secondary digital rights management system, wherein the upgraded license or rights is configured to provide upgraded rights to access the media by the secondary digital rights management system.

32. An apparatus as in claim 31 wherein the server of the secondary digital rights management system comprises an upgrade server of the secondary digital rights management system,
  and wherein the upgrade server of the secondary digital rights management system sends a request for an authorization to the original digital rights management system to get the upgrade license or rights.

33. An apparatus as in claim 32 wherein the upgrade server of the secondary digital rights management system comprises a server in the bridge, or a separate independent server.

34. An apparatus as in claim 32 wherein the original digital rights management system for the communication comprises at least one of a server sending the media, and a separate billing or upgrade server of the original digital rights management system.

35. An apparatus as in claim 32 wherein the client sends the request to the bridge, or to an independent server of the secondary digital rights management system before reaching the original digital rights management system.

36. An apparatus as in claim 31 wherein the authorization is sent from the original digital rights management (DRM) system to the secondary digital rights management system and wherein the bridge includes a client of the original DRM system and the server of the secondary DRM system.

37. An apparatus as in claim 31 wherein the authorization from the original digital rights management system is provided by a billing system that is configured to authorize the upgrading the access to the media to the secondary digital rights management system.

38. An apparatus as in claim 31 wherein the upgraded license or rights is configured to provide at least one of extending the lifetime of the license, enabling new rights, enabling new exports, enabling move operation or restoration operation to another machine, or any combination thereof.

39. An apparatus as in claim 38 wherein enabling new rights comprises allowing additional copy.

40. An apparatus as in claim 38 wherein enabling new exports comprises additional bridging.

41. An apparatus as in claim 31 wherein some of the license renewal data include at least one of data identifying a preferred secondary DRM update server, subscriber identification data, device identification data, media identification data, targeted DRM client data, schedule data, and data for a DRM update server to retrieve a key for the media.

42. An apparatus as in claim 31 wherein some of the license renewal data are extracted and used to create the upgraded license.

43. An apparatus as in claim 31 wherein some of the license renewal data are used to log or authorize the upgrade access transaction.

44. An apparatus for a client of a secondary digital rights management system to get an upgraded access to a media originated from an original digital rights management system, the media stored within the access of the client of the secondary digital rights management system, the media sent through a bridge from the original digital rights management system to the secondary digital rights management system and being translated to include an additional information to allow the upgraded operation to be reconciled with the original digital rights management system and so that the secondary digital rights management system can modify the access, the apparatus comprising:
  a processor;
  a memory coupled with said processor, said memory having contained therein sequences of instructions which, when executed by said processor, cause said processor to perform operations comprising
  sending, by the client of the secondary digital rights management system, a request with the additional information to an upgrade server of the secondary digital rights management system to get new rights to the media, wherein the upgrade server is configured to extract
  the additional information, wherein the additional information has been previously created and secured, through encryption and authentication for use by the original digital rights management system and have been previously added to the media by the bridge at the time the media was first issued to the secondary digital rights management system;
  receiving, by the client of the secondary digital rights management system the new rights to access the media wherein the new rights are provided by the upgrade server of the secondary digital rights management system based on an authorization sent from the original digital rights management system, wherein the authorization is provided by the original digital rights management system based on the additional information sent by the client of the secondary digital rights management system.

45. An apparatus as in claim 44 wherein the bridge includes a client of the original digital rights management (DRM) system and a server of the secondary DRM system.

46. An apparatus as in claim 44 wherein the additional information from the original digital rights management system comprises additional license renewal data.

47. An apparatus as in claim 46 wherein the additional license renewal data are cryptographically linked to the license.

48. An apparatus as in claim 46 wherein the additional license renewal data are also secured by the secondary digital rights management system.

49. An apparatus as in claim 46 wherein the additional license renewal data comprise subscriber identification data, event identification data, time stamp, device identification data, renewal traceability data, restore data, encrypted content key, or any combination thereof.

50. A machine non-transitory readable medium containing machine executable program instructions which, when executed by a data processing system, cause the data processing system to perform a method for repurposing a media, the media originated from an original digital rights management system and passed through a bridge to be under the protection of a secondary digital rights management system, the method comprising:
  receiving a license upgrade request by a server of the secondary digital rights management system, with license renewal data, wherein the license renewal data have been previously created and secured, through encryption and authentication by the original digital rights management system and have been previously added to the media by the bridge at the time the media was first issued to the secondary digital rights management system,
  sending, by the server of the secondary digital rights management system, a request for an authorization to upgrade the secondary digital rights management license to the original digital rights management system, the request including the license renewal data;
  receiving, by the server of the secondary digital rights management system, the authorization, wherein the authorization is provided from the original digital rights management system based on the license renewal data; and
  upgrading, by the server of the secondary digital rights management system, the secondary digital rights management license based on the authorization to provide second rights to access the media from the secondary digital rights management system.

51. A medium as in claim 50 wherein the bridge includes a client of the original digital rights management (DRM) system and the server of the secondary DRM system.

52. A medium as in claim 50 wherein the authorization from the original digital rights management system is provided by a billing system that is configured to authorize the upgrading the media access to the secondary digital rights management system.

53. A medium as in claim 50 wherein upgrading the secondary digital rights management license comprises at least one of extending a lifetime of the license, enabling new rights, enabling new exports, enabling move operation or restoration operation to another machine, or any combination thereof.

54. A medium as in claim 50 wherein some of the license renewal data include at least one of data identifying a preferred secondary DRM update server, subscriber identification data, device identification data, media identification data, targeted DRM client data, schedule data, and data for a DRM update server to retrieve a key for the media.

55. A machine non-transitory readable medium containing machine executable program instructions which, when executed by a data processing system, cause the data processing system to perform a method, the method to be used for a client of a secondary digital rights management system to get an upgraded access to a media originated from an original digital rights management system, the media stored within the access of the client of the secondary digital rights management system, the media sent through a bridge from the original digital rights management system to the secondary digital rights management system, and wherein license renewal data have been previously added to the media by the bridge at the time the media was first issued to the secondary digital rights management system, the method comprising:
  sending, by the client of the secondary digital rights management system, a request with the license renewal data to a server of the secondary digital rights management system to get an upgraded license or rights;
  receiving, by the client of the secondary digital rights management system, the upgraded license or rights to access the media, wherein the upgraded license or rights is created by the secondary digital rights management system based on an authorization sent from the original digital rights management system, wherein the authorization is provided by the original digital rights management system based on the license renewal data sent by the client of the secondary digital rights management system, wherein the license renewal data have been previously created and secured, through encryption and authentication by the original digital rights management system and have been previously added to the media by the bridge at the time the media was first issued to the secondary digital rights management system, wherein the upgraded license or rights is configured to provide upgraded rights to access the media by the secondary digital rights management system.

56. A medium as in claim 55 wherein the server of the secondary digital rights management system comprises an upgrade server of the secondary digital rights management system, wherein the upgrade server of the secondary digital rights management system sends a request for the authorization to the original digital rights management system to get the upgrade license or rights.

57. A medium as in claim 56 wherein the upgrade server of the secondary digital rights management system comprises a server in the bridge, or a separate independent server.

58. A medium as in claim 56 wherein the original digital rights management system for the communication comprises at least one of a server sending the media, and a separate billing or upgrade server of the original digital rights management system.

59. A medium as in claim 56 wherein the client sends the request to the bridge, or to an independent server of the secondary digital rights management system before reaching the original digital rights management system.

60. A medium as in claim 55 wherein the authorization is sent from the original digital rights management (DRM) system to the secondary digital rights management system and wherein the bridge includes a client of the original DRM system and the server of the secondary DRM system.

61. A medium as in claim 55 wherein the authorization from the original digital rights management system is provided by a billing system that is configured to authorize the upgrading the access to the media to the secondary digital rights management system.

62. A medium as in claim 55 wherein the upgraded license or rights is configured to provide at least one of extending the lifetime of the license, enabling new rights, enabling new exports, enabling move operation or restoration operation to another machine, or any combination thereof.

63. A medium as in claim 62 wherein enabling new rights comprises allowing additional copy.

64. A medium as in claim 62 wherein enabling new exports comprises additional bridging.

65. A medium as in claim 55 wherein some of the license renewal data include at least one of data identifying a preferred secondary DRM update server, subscriber identification data, device identification data, media identification data, targeted DRM client data, schedule data, and data for a DRM update server to retrieve a key for the media.

66. A medium as in claim 55 wherein some of the license renewal data are extracted and used to create the upgraded license.

67. A medium as in claim 55 wherein some of the license renewal data are used to log or authorize the upgrade access transaction.

68. A machine non-transitory readable medium containing machine executable program instructions which, when executed by a data processing system, cause the data processing system to perform a method, the method to be used for a client of a secondary digital rights management system to get an upgraded access to a media originated from an original digital rights management system, the media stored within the access of the client of the secondary digital rights management system, the media sent through a bridge from the original digital rights management system to the secondary digital rights management system and being translated to include an additional information to allow the upgraded operation to be reconciled with the original digital rights management system and so that the secondary digital rights management system can modify the access, the method comprising:

sending, by the client of the secondary digital rights management system, a request with the additional information to an upgrade server of the secondary digital rights management system to get new rights to the media, wherein the upgrade server is configured to extract the additional information, wherein the additional information has been previously created and secured, through encryption and authentication by the original digital rights management system and has been previously added to the media by the bridge at the time the media was first issued to the secondary digital rights management system;

receiving, by the client of the secondary digital rights management system, the new rights to access the media wherein the new rights are provided by the upgrade server of the secondary digital rights management system based on an authorization sent by the original digital rights management system, wherein the authorization is provided by the original digital rights management system based on the additional information sent by the client of the secondary digital rights management system.

69. A medium as in claim 68 wherein the bridge includes a client of the original digital rights management (DRM) system and a server of the secondary DRM system.

70. A medium as in claim 68 wherein the additional information from the original digital rights management system comprises additional license renewal data.

71. A medium as in claim 70 wherein the additional license renewal data are cryptographically linked to the license.

72. A medium as in claim 70 wherein the additional license renewal data are also secured by the secondary digital rights management system.

73. A medium as in claim 70 wherein the additional license renewal data comprise subscriber identification data, event identification data, time stamp, device identification data, renewal traceability data, restore data, encrypted content key, or any combination thereof.

74. A method of repurposing a media originated from an original digital rights management (DRM) system and passed through a bridge to be under the protection of a secondary DRM, the method performed by at least one system of the original DRM, the method comprising:

receiving, by the original digital rights management (DRM) system, a request to upgrade the media from a system in the secondary DRM, the request comprising additional information, wherein the additional information has been previously created and secured, through encryption and authentication by the original digital rights management system and has been previously added by the bridge to the media at the time the media was first issued to the secondary digital rights management system;

transmitting an authorization from the at least one system of the original DRM in response to the request, wherein the authorization is provided by the at least one system of the original DRM based on the additional information, wherein the license of the secondary DRM is renewed by the secondary DRM in response to the authorization.

75. A method of repurposing a media originated from an original digital rights management (DRM) system and passed through a bridge to be under the protection of a secondary DRM, the method performed by at least one component of the bridge, the method comprising:

receiving, by the at least one component of the bridge, a request to upgrade access to the media with license renewal information from a system in the secondary DRM, wherein the license renewal information has been previously created and secured, through encryption and authentication by the original digital rights management system and has been previously added to the media by the bridge at the time the media was first issued to the secondary digital rights management system;

extracting, by the at least one component of the bridge, the license renewal information;

transmitting, by the at least one component of the bridge, the request to the original DRM system, the request comprising the license renewal information;

receiving an authorization to upgrade the media, wherein the authorization is provided from the original digital rights management system based on the license renewal information;

renewing the license of the media of the secondary DRM based on the authorization.

* * * * *